United States Patent
Eickhoff

(10) Patent No.: US 7,807,131 B2
(45) Date of Patent: Oct. 5, 2010

(54) HYDROGEN PRODUCING FUEL FOR POWER GENERATOR

(75) Inventor: Steven J. Eickhoff, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 181 days.

(21) Appl. No.: 11/934,011

(22) Filed: Nov. 1, 2007

(65) Prior Publication Data

US 2009/0113795 A1    May 7, 2009

(51) Int. Cl.
  B01J 20/04    (2006.01)
(52) U.S. Cl. .................................... 423/658.2
(58) Field of Classification Search ................ 429/19; 423/648.1, 658.2, 286; 502/400, 414, 526; 420/900; 422/239
See application file for complete search history.

(56) References Cited

U.S. PATENT DOCUMENTS

| | | | |
|---|---|---|---|
| 4,155,712 A | 5/1979 | Taschek | |
| 4,261,955 A | 4/1981 | Bailey, Jr. et al. | |
| 5,372,617 A | 12/1994 | Kerrebrock et al. | |
| 5,443,616 A | 8/1995 | Congdon | |
| 5,527,632 A | 6/1996 | Gardner | |
| 5,634,341 A | 6/1997 | Klanchar et al. | |
| 5,932,369 A * | 8/1999 | Komada et al. | 429/59 |
| 5,958,098 A | 9/1999 | Heung | |
| 6,093,501 A | 7/2000 | Werth | |
| 6,280,865 B1 | 8/2001 | Eisman et al. | |
| 6,432,566 B1 | 8/2002 | Condit et al. | |
| 6,528,441 B1 | 3/2003 | Heung et al. | |
| 6,586,124 B2 | 7/2003 | Kelley et al. | |
| 7,556,660 B2 * | 7/2009 | Shurtleff et al. | 48/61 |
| 2002/0182459 A1 | 12/2002 | Hockaday et al. | |
| 2003/0207175 A1 * | 11/2003 | Ovshinsky et al. | 429/231.2 |
| 2003/0228252 A1 | 12/2003 | Shurtleff | |
| 2005/0079129 A1 | 4/2005 | Venkatesan et al. | |
| 2005/0106097 A1 * | 5/2005 | Graham et al. | 423/648.1 |
| 2005/0112018 A1 | 5/2005 | Schulz et al. | |
| 2005/0238810 A1 | 10/2005 | Scaringe et al. | |
| 2006/0101943 A1 | 5/2006 | Snow et al. | |

(Continued)

FOREIGN PATENT DOCUMENTS

DE    19941085 A1    3/2001

(Continued)

OTHER PUBLICATIONS

Diaz, H., et al., "Thermodynamic and Structural properties of LaNi5-yAly compounds and their related hydrides", *International Journal of Hydrogen Energy*, 4, (1979),445-454.

(Continued)

*Primary Examiner*—Frank M Lawrence
(74) *Attorney, Agent, or Firm*—Schwegman, Lundberg & Woessner, P.A.

(57) ABSTRACT

A hydrogen producing fuel comprises a chemical hydride and metal hydride. In one embodiment the chemical hydride evolves hydrogen spontaneously upon exposure to water vapor, and the metal hydride reversibly absorbs/desorbs hydrogen based on temperature and pressure. The hydrogen producing substance may be formed in the shape of a pellet and may be contained within a hydrogen and water vapor permeable, liquid water impermeable membrane.

22 Claims, 16 Drawing Sheets

U.S. PATENT DOCUMENTS

| | | | |
|---|---|---|---|
| 2006/0292065 | A1 | 12/2006 | Wolverton et al. |
| 2007/0031325 | A1 | 2/2007 | Carruthers et al. |
| 2007/0124989 | A1* | 6/2007 | Eickhoff et al. ............... 44/301 |
| 2008/0241613 | A1* | 10/2008 | Kelly et al. ................... 429/17 |
| 2009/0098419 | A1* | 4/2009 | Eickhoff et al. ................ 429/9 |

FOREIGN PATENT DOCUMENTS

| | | |
|---|---|---|
| DE | 102004061286 A1 | 6/2006 |
| JP | 08067939 | 3/1996 |
| WO | WO-2005/004273 A2 | 1/2005 |
| WO | WO-2005/064227 | 7/2005 |
| WO | WO-2006005892 A1 | 1/2006 |
| WO | WO-2006091227 A1 | 8/2006 |
| WO | WO-2007/008893 | 1/2007 |
| WO | WO-2007/055763 | 5/2007 |
| WO | WO-2007067406 A2 | 6/2007 |

OTHER PUBLICATIONS

Mendelsohn, M. H., et al., "The Effect of Aluminum Additions on the Structural and Hydrogen Absorption properties of AB5 Alloys with Particular reference to the LaNi5-xAlx Ternary Alloy System", *Journal of the Less-Common Metals*, 63, (1979),193-207.

Pasaogullari, Ugur , "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California,(Nov. 13-20, 2004),1-9.

"U.S. Appl. No. 11/789,520, Response filed Jan. 4, 2010 to Final Office Action mailed Nov. 18, 2009", 14 pgs.

"U.S. Appl. No. 11/789,520 Non Final Office Action Mailed Jun. 25, 2009", 13.

"U.S. Appl. No. 11/789,520, Final Office Action mailed Nov. 18, 2009", 13 pgs.

"U.S. Appl. No. 11/789,520, Response filed Sep. 24, 2009 to Non Final Office Action mailed Jun. 25, 2009", 13 pgs.

"U.S. Appl. No. 11/934,011, Response to Restrictions filed Jul. 16, 2009", 7.

"U.S. Appl. No. 11/934,011, Restriction Requirement", 6 pgs, mailed Jul. 2009.

Mintz, M., et al., "The reaction of hydrogen with magnesium alloys and magnesium intermetallic compounds", *Journal of the Less-Common metals, Elsevier-Sequoia S.A Lausanne, CH*, vol. 74, No. 2, 263-270 pgs, 1980.

Saboungi, M. L, et al., "Computation of isothermal sections of the Al-H-Mg system", *Calphad. Computer Coupling of the Phase Diagrams and Thermochemistry, New York, NY, US*, vol. 1, No. 3, 237-251 pgs, 1977.

Yabe, et al., "Thermal stability and hydrogen absorption/desorption properties of Mg17A112 produced by bulk mechanical alloying", *Journal of Alloys and Compounds, Elsevier Sequoia, Lausanne, CH*, vol. 433, No. 1-2, 241-245 pgs, Jul. 2006.

Zhang, et al., "Hydriding behaviour of Mg17A112 compound", *Materials Chemistry and Physics, Elsevier*, vol. 94, No. 1, 69-72 pgs, 2005.

"European Application Serial No. 08166990.5, European Office Action mailed Mar. 10, 2010", 5 pgs.

"European Application Serial No. 08166990.5, European Search Report mailed Feb. 19, 2010", 3 Pgs.

\* cited by examiner

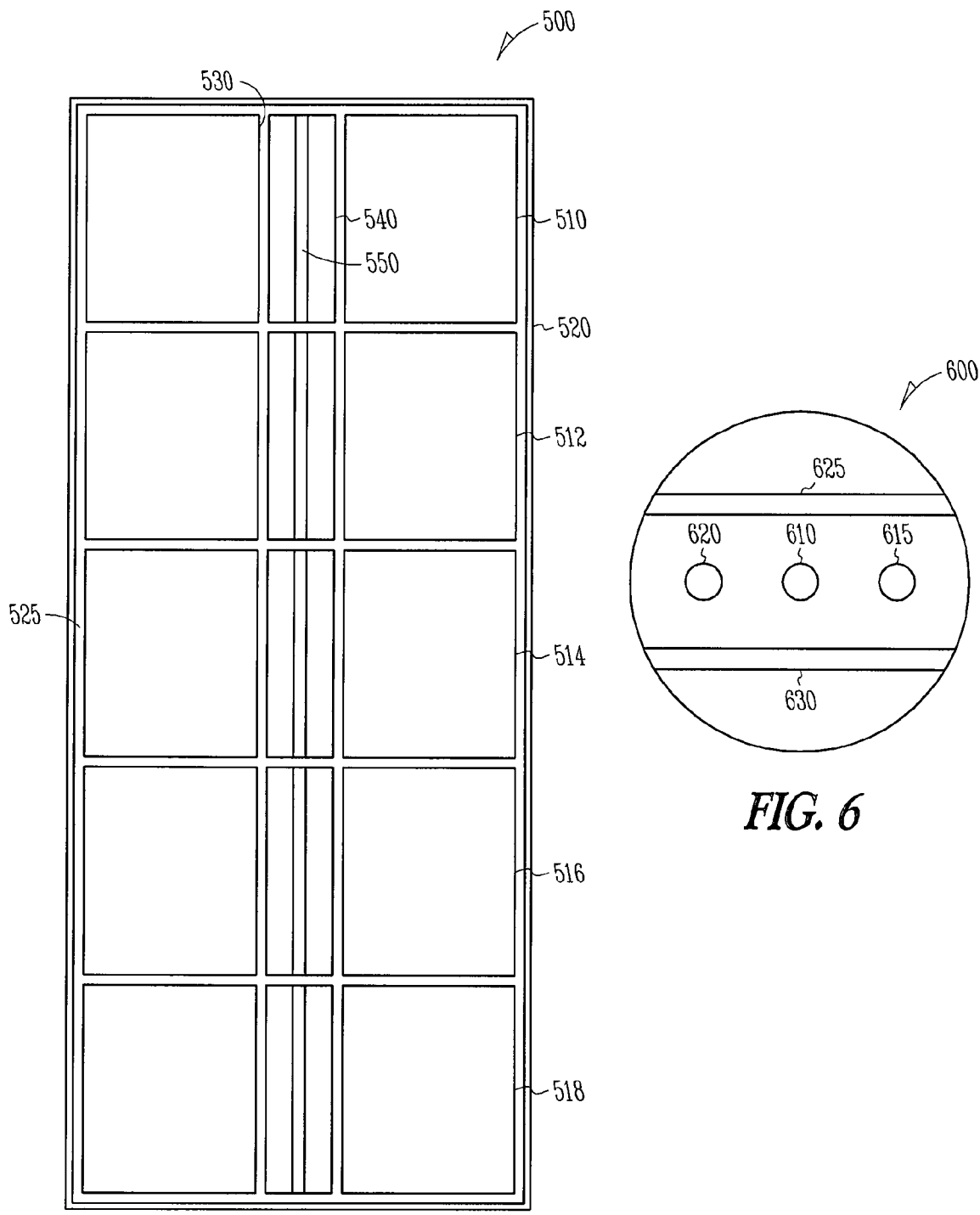
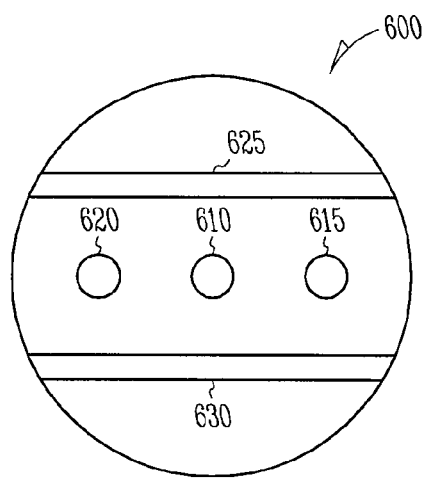
*FIG. 5*
*FIG. 6*

HYDROGEN PRODUCING FUEL FOR POWER GENERATOR

BACKGROUND

Similar to batteries, fuel cells function to produce electricity through chemical reactions. Rather than storing reactants as batteries do, fuel cells are operated by continuously supplying reactants to the cell. In a typical fuel cell, hydrogen gas acts as one reactant and oxygen as the other, with the two reacting at electrodes to form water molecules and releasing energy in the form of direct current electricity. The apparatus and process may produce electricity continuously as long as hydrogen and oxygen are provided. While oxygen may either be stored or provided from the air, hydrogen gas may be generated from other compounds through controlled chemical reactions rather than storing hydrogen, which may need to be compressed or cryogenically cooled. As fuel cell technology evolves, so do the means by which hydrogen gas is generated for application with fuel cells.

One means by which hydrogen gas is generated is through reactive chemical hydrides. This process involves chemically generating hydrogen gas from dry, highly reactive solids by reacting them with water. Chemicals especially suitable for this process are lithium hydride, calcium hydride, lithium aluminum hydride, sodium borohydride and combinations thereof, each of which is capable of releasing plentiful quantities of hydrogen.

It has been found that the reaction products from the chemical hydride and liquid water typically form a cake or pasty substance which interferes with further reaction of the reactive chemical with the liquid water or acid. Furthermore, the reaction of chemical hydrides with liquid are difficult to control, and generally results in the production of much more hydrogen gas than needed to power small electronic devices.

In order to combat this problem, methods have been introduced wherein a hydrogen fuel can be reacted with gaseous water vapor, instead of liquid water. In many hydrogen generator designs, an elaborate power generator system is used in order to regulate the quantity of water vapor that reacts with the chemical fuel and to regulate the reaction rate of water vapor with the chemical fuel.

BRIEF DESCRIPTION OF THE DRAWINGS

FIG. 5 is a cross section representation of a plurality of segments of a fuel pellet having a bore according to an example embodiment.

FIG. 6 is a cross section representation of a cylindrical fuel pellet having multiple bores according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A fuel pellet is described that is comprised of chemical hydride, metal hydride, and a selectively permeable membrane. The chemical hydride portion of the fuel pellet may be segmented into a number of parts with gas spaces in between to facilitate transport of water vapor and hydrogen. In one embodiment, the chemical hydride evolves hydrogen spontaneously upon exposure to water vapor, and the metal hydride reversibly adsorbs/desorbs hydrogen based on temperature and hydrogen pressure. In various embodiments, the chemical hydride of the fuel pellet provides a large store of releasable hydrogen for a fuel cell, and the metal hydride provides higher levels of hydrogen for pulse intervals of higher demand. The selectively permeable membrane is a water impermeable and hydrogen and water vapor permeable membrane. It may also provide some containment to help the fuel pellet keep a desired shape, and also to prevent fuel particles from leaving the pellet and contaminating the power generator. Desired shapes include those suitable for existing and future common form factor batteries. In further embodiments, the fuel pellet may be fissurized to further facilitate water vapor and hydrogen transport.

Figure 1:
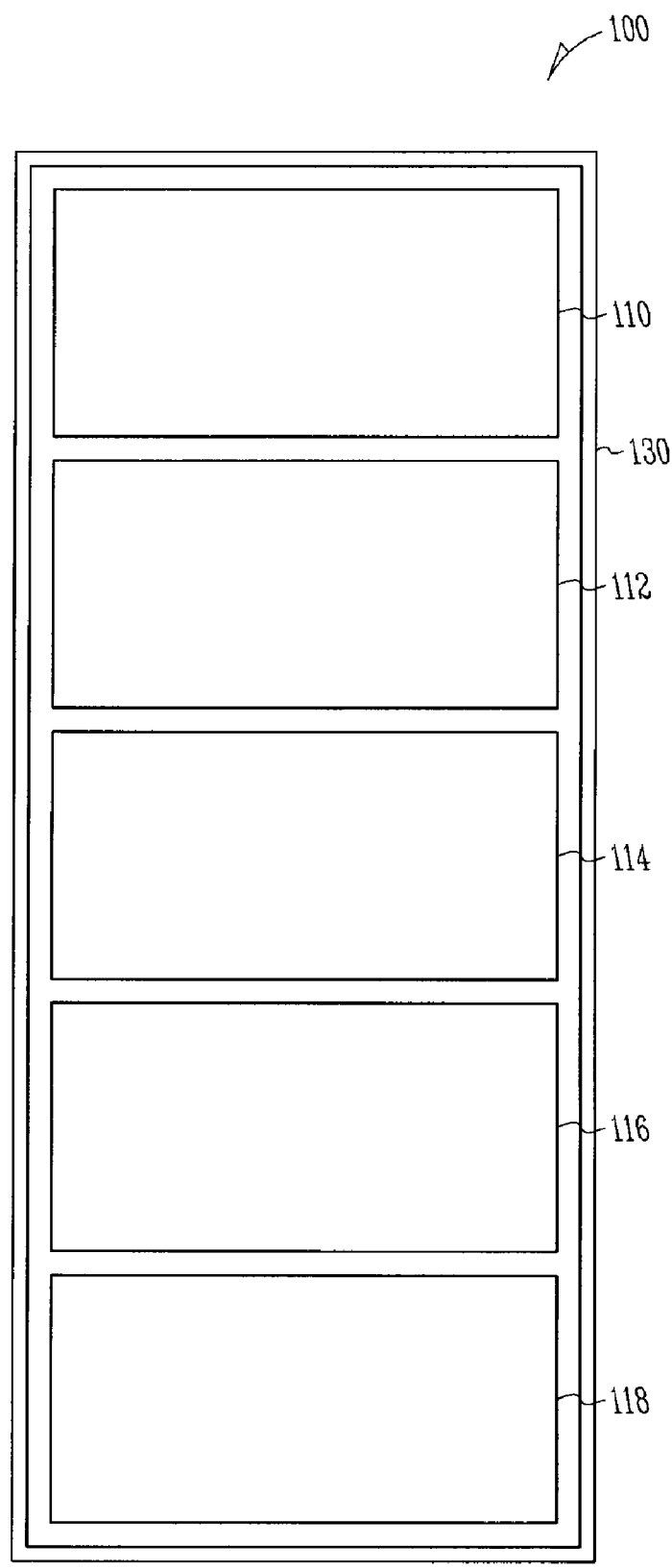
FIG. 1 is a cross section representation of a fuel pellet according to an example embodiment.

FIG. 1 illustrates a fuel pellet 100 that includes multiple segments 110, 112, 114, 116, and 118, the fuel pellet 100 may be formed of a non-fluid, hygroscopic, porous material. Such a pellet may be useful in hydrogen gas generating power generators that incorporate one or more fuel cells. A power generator may include a fuel chamber within a generator housing that holds the fuel, which may be encapsulated or wrapped in a water impermeable, hydrogen and water vapor permeable material 130. Reaction of the fuel with water vapor produces hydrogen gas that is used by the at least one fuel cell to generate electricity.

In one embodiment, the fuel pellet comprises a non-fluid, hygroscopic, porous material in pellet form that allows for the diffusion of gases and vapors. Materials which may be used non-exclusively include alkali metals, calcium hydride, lithium hydride, lithium aluminum hydride, lithium borohydride, sodium borohydride and combinations thereof. Suitable alkali metals non-exclusively include lithium, sodium and potassium. When contacted with water molecules, these fuels react, releasing hydrogen gas. The fuel may optionally be combined with a hydrogen generation catalyst to catalyze the reaction of the water vapor and the non-fluid substance. Suitable catalysts may non-exclusively include cobalt, nickel, ruthenium, magnesium and alloys and combinations thereof.

Figure 2:
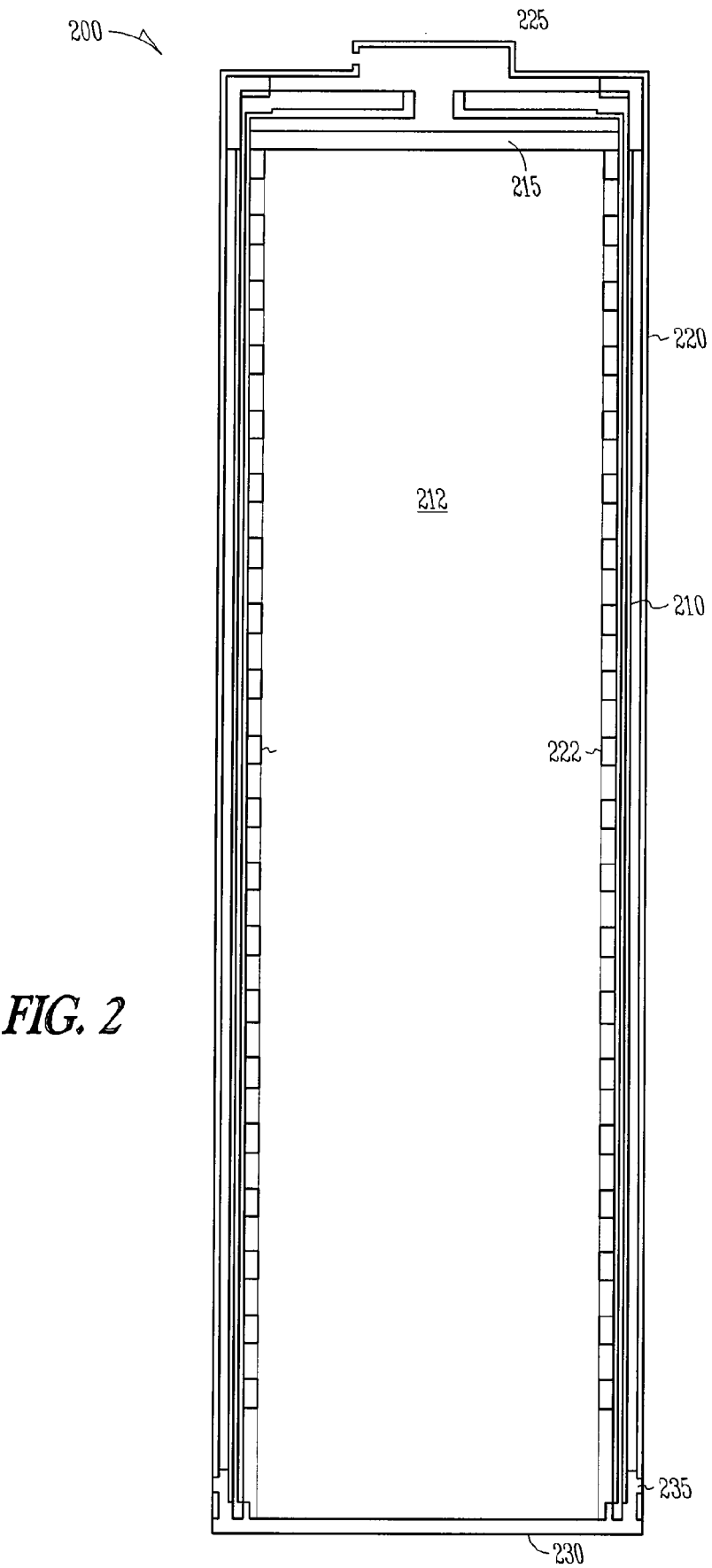
FIG. 2 is a cross section representation of a power generator incorporating a fuel pellet according to an example embodiment.

The fuel pellet 100 may be used in a power generator 200 illustrated in cross section in FIG. 2. A fuel cell layer 210 may be wrapped around the fuel pellet 100. A membrane 215 may be disposed within a container 220 that is responsive to pressure differences between the inside of the power generator 200 and ambient to regulate the generation of hydrogen via valves, which may be integral with the fuel cell layer 210, or otherwise disposed within container 220. The fuel cell layer 210 may be electrically coupled to a cathode 225 and anode 230 positioned in desired locations, such as on either end of the container 220.

In one embodiment, the container 220 has a shape adapted to be consistent with desired common battery shapes, such as "AA", "AAA" "C" and "D" cells. The fuel pellet may have a cylindrical shape and also may be adapted to be consistent with the desired shape. Other shapes of containers may also be provided consistent with other battery shapes existing or new battery shapes.

In one embodiment, the fuel pellet may be fissurized to increase the surface area of the pellet to allow penetration of water vapor. A fissurized pellet is a pellet that has been crushed to have cracks, and may be into pieces, but still keeps a desired form. Overall porosity may be increased. The fissurized pellet has fissures that allow the water vapor to diffuse into the pellet, effectively increasing the surface area the pellet presents to water vapor.

Figure 3:
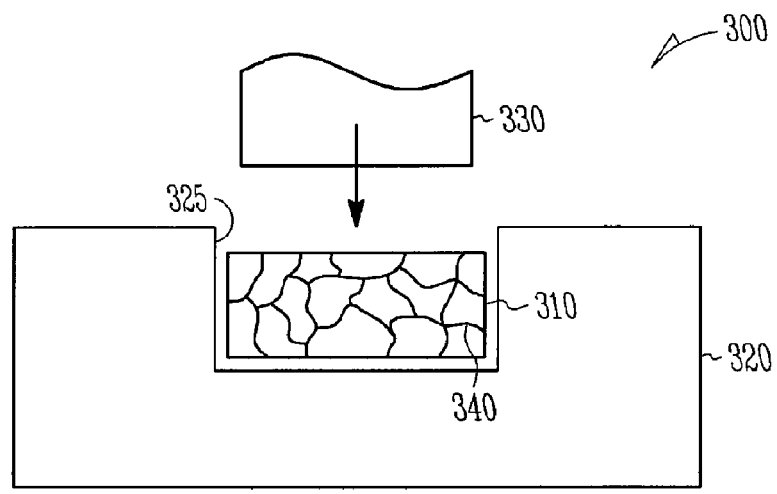
FIG. 3 is a cross section representation of chemical hydride for a fuel pellet being fissurized according to an example embodiment.

A device 300 for fissurizing a pellet is shown in cross section in FIG. 3, with a pellet 310 placed into a fixture 320. Fixture 320 is provided with an opening 325 that provides a chamber for the pellet 310 that prevents the pellet from changing shape as it is fissurized. A piston 330 or other impacting device is thrust toward an exposed surface of the pellet 310, causing multiple fissures 340 to occur. The representation of the fissures 340 in FIG. 3 is not meant to be representative of the actual appearance of fissures within a pellet. The force of the piston may be such that fissures are created without significantly modifying the shape of the pellet, allowing it to retain its form when removed from the opening 325. In one embodiment, the force of the piston is sufficient to cause a significant number of water vapor penetrable fissures to effectively increase the surface area of the pellet, allowing the pellet to provide a higher rate of hydrogen on demand.

Other methods of causing such fissurization of a pellet may be used, such as different forms of pistons, or different types of impacting. In one embodiment, cycles of heating and cooling may be used, and may include the use of a temperature responsive solvent to create the fissures.

Figure 4:
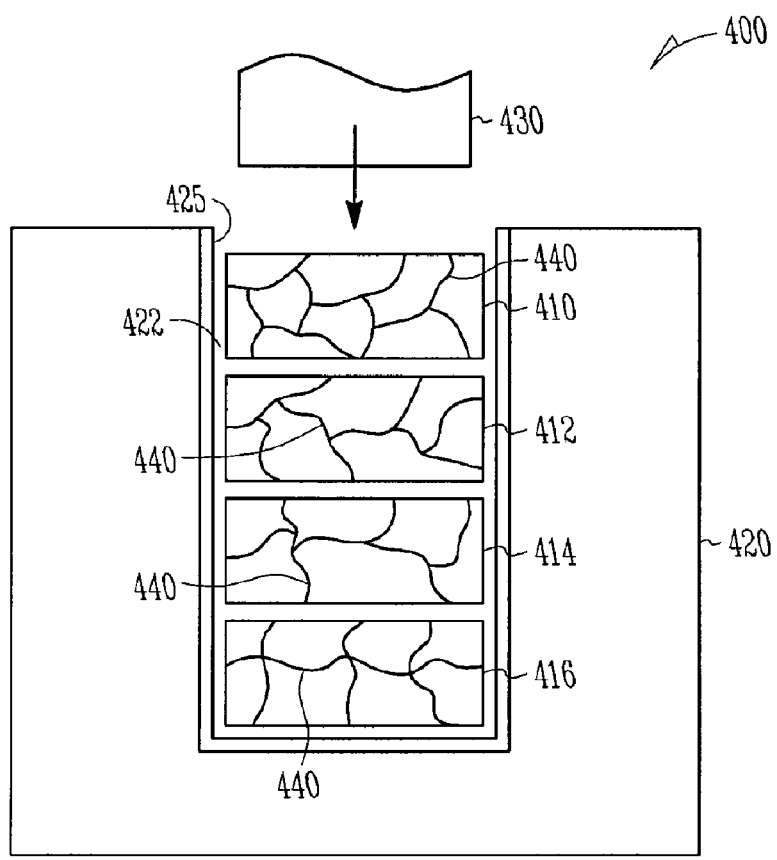
FIG. 4 is a cross section representation of a multiple segments of chemical hydride for a fuel pellet being fissurized according to an example embodiment.

A similar device 400 is illustrated in FIG. 4. Multiple pellet segments 410, 412, 414 and 416 are illustrated in a fixture 420. A water vapor permeable, water impermeable membrane 422 is provided around the pellet. Fixture 420 is provided with an opening 425 that provides a chamber for the pellet that helps prevent the pellet from changing shape as it is fissurized. A piston 430 or other impacting device is thrust toward an exposed surface of the pellet, causing multiple fissures 440 to occur. The force of the piston may be such that fissures are created without significantly modifying the shape of the pellet, allowing it to retain its form when removed from the opening 425.

In one embodiment, the force of the piston is sufficient to cause a significant number of water vapor penetrable fissures to effectively increase the surface area and porosity of the pellet, allowing the pellet to provide a higher rate of hydrogen on demand. In one embodiment, the force may be increased due to the ability of the membrane 422 to help the pellet maintain its shape. In one embodiment, the fissurized pellet is soaked in the hydrophobic material which penetrates at least some of the fissures to help prevent significant hydrogen generation if the pellet is exposed to liquid water.

Further details regarding the water vapor permeable, liquid water impermeable material 130 are now provided. The water vapor permeable, liquid water impermeable material 130 may comprise any material having such properties, and includes porous polymer films and fabrics, as well as oils and rubbers. The fuels may be encapsulated using any suitable method which would be appropriate for the chosen encapsulation material, such as wrapping, coating and the like. In one embodiment a layer of a water vapor permeable, liquid water impermeable material is wrapped around the fuel, and optionally the ends of the fuel.

In one embodiment, the water vapor permeable, liquid water impermeable material 130 comprises a micro-porous polymeric film. Such polymeric films non-exclusively include mono- and multilayer fluoropolymer containing materials, a polyurethane containing materials, polyester containing materials or polypropylene containing materials. Suitable fluoropolymer containing materials include polytetrafluoroethylene (PTFE) and expanded polytetrafluoroethylene (ePTFE), PFA, FEP. Example fluoropolymer containing materials are films and fabrics commercially available under the Gore-Tex®, eVent® and HyVent® trademarks. Gore-Tex® is an e-PTFE material commercially available from W.L. Gore and Associates of Newark, Del. and eVENT® is a PTFE material manufactured by BHA technologies of Delaware. HyVent® is polyurethane containing material commercially available from The North Face Apparel Corp., of Wilmington, Del. Of these, ePTFE GORE-TEX® materials are preferred.

Each of these materials may be in the form of single or multilayer films or fabrics, or as coatings, and are known as waterproof, breathable materials. Breathable membranes are typically constructed from a micro-porous layer of expanded PTFE, polyurethane or polypropylene that is laminated to the face of a film such as nylon or polyester. Breathable coatings are typically formed by spreading a thin layer of a micro-porous or hydrophobic polymer directly on the surface of a material, such as the solid fuels of the invention. Breathability is generally measured in two ways. In one method, the water vapor transmission rate of a material may be tested as a rating in grams of how much vapor a square meter, or alternately 100 in$^2$, of fabric will allow to pass through in 24 hours (g/m$^2$/24 hours or g/100 in$^2$/24 hours). Conventional testing methods include the procedures set forth in ASTM E-96 Method B and the procedures set forth in ASTM F1249. The second method is known as Evaporative Resistance of a Textile (RET). The lower the RET, the higher the breathability, i.e. the greater the amount of moisture that will pass through. Based on an ASTM E-96 Method B breathability, rates of 100-10000 g/m²*24 h, 500-2000 g/m²*24 h, and 700-1200 g/m²*24 h. Other rates may also be used, both within the ranges described, and outside of such ranges.

The micro-porous materials generally have a pore size of from about 0.001 μm to about 1 μm in diameter, and a thickness of from about 0.1 μm to about 100 μm. The porosity and thickness of the materials can be tailored to give a desired water vapor flux, while preventing liquid water penetration. In one embodiment, the films or fabrics have a pore size consistent with obtaining a desired overall moisture permeability. In some embodiments, the pore size may range from about 0.01 μm to about 5 μm. Larger or smaller pore sizes may be utilized in conjunction with other design parameters to obtain a desired overall moisture permeability.

In another embodiment, the water vapor permeable, liquid water impermeable material comprises a micro-porous oil or rubber coating. In one embodiment, a hydrophobic material is used that soaks into the pellet, preventing rapid release of hydrogen if the pellet is damaged and the interior is exposed to liquid water. Such materials may include PTFE dispersions and other materials such as oils that may soak into a pellet, preventing rapid release of hydrogen if the pellet is damaged and exposed to liquid water. Oils may non-exclusively include mineral oil, petroleum based oils consisting primarily of saturated hydrocarbons, oily solvents such as xylene, paraffin wax. Such rubbers non-exclusively include curable rubber, isoprene, silicone, polyurethane, neoprene, and fluoropolyether based rubbers. Any conventional coating method may be used to encapsulate the fuel with a micro-porous oil or rubber coating. For example, a fuel may be mixed with an oil or rubber solution, a solvent and a curing agent to form a blend, which blend is warmed and stirred to a desired consistency, granulated, dried and optionally pelletized. Suitable solvents for forming an oil or rubber solution non-exclusively include ketones such as methyl ethyl ketone, methyl isobutyl ketone, ethers, and ester. Suitable curing agents non-exclusively include organosilanes containing at lease one isocyanate group. Such blends may be formed in a suitable vessel at a temperature of from about 0° C. to about 1000° C., or from about 20° C. to about 500° C., and dried for from about 1 to about 24 hours. Other granulation and pellet forming techniques may also be used.

Similar to the films described above, the porosity and thickness of the oil or rubber coating materials can be tailored to give a desired water vapor flux, while preventing liquid water penetration. In one embodiment, the oil or rubber coating materials have a pore size of from about 0.001 μm to about 1 μm, or from about 0.01 μm to about 0.5 μm, or from about 0.05 μm to about 0.1 μm. Further, in one embodiment, the oil or rubber coating materials have a thickness of from about 0.01 μm to about 10 μm, or from about 0.05 μm to about 5 μm, or from about 0.1 μm to about 1 μm.

While the fuels described are particularly well suited for use in a power generator apparatus, the encapsulated fuels may be used with virtually any type of power generator device that is designed to utilize in-situ generated hydrogen gas.

Pellet Manufacturing

In one embodiment, fifty grams of fine lithium aluminum hydride powder may be mixed in 100 ml hexane and approximately 0.1 grams of a curable rubber solution. The curable rubber solution includes a curing agent. The mixture may be warmed in a hood to 500° C. and stirred. The mixture may be stirred continuously as it is warmed, until the entire mixtures has a soft, rubbery consistency. The soft mass may be removed from the hood and granulated over a 400 mesh sieve. The granules are collected and dried at approximately 600° C. in an air oven in a hood for approximately 8 hours. The dried granules are pelletized in a press and ready for use. This is just one example method for preparing granules for a pellet. The parameters may be varied in further embodiments, and different methods may be used as desired.

In one embodiment, the pellets are solid and approximately 20% porous. The porosity may be varied to control volume expansion and hydrogen generation rate. Multiple pellet segments may be stacked vertically to provide a cylindrical pellet with larger height. The height of the individual segments may also be varied to increase the pellet surface area, which may also increase the hydrogen generation rate. In one embodiment, the pellet may be subjected to crushing to further increase the surface area via fissurization, while still maintaining their cylindrical form.

FIG. 5 is a cross section representation of a further fuel package 500. Fuel package 500 includes multiple chemical hydride fuel pellet segments 510, 512, 514, 516, and 518 stacked in a vertical relationship. A water vapor permeable, water impermeable membrane 520 may be disposed about the fuel pellet segments, which may be cylindrical in shape. The membrane 520 may extend over the ends of the stack of fuel pellets in some embodiments. An air gap may be provided between the membrane 520 and fuel pellet if desired.

A bore 530 may be formed in the fuel pellet in one embodiment. The bore 530 may extend through one or more segments, or may extend partially through one or more segments. In one embodiment, the bore is concentric with the axis of the fuel pellet, but may also be parallel, or transverse to the axis or at any angle therebetween. The bore 530 may provide room for expansion of the fuel pellet under varying time and environmental conditions.

In a further embodiment, the bore 530 may have a metal hydride porous rod 540 or pellet segments disposed within it. The rod may be cylindrical in one embodiment. In further embodiments, the rod 540 may be shaped consistent with the shape of the bore 530, or may have a different shape than the bore 530 to allow for easier migration of water vapor. In one embodiment, the rod 540 is the same shape as the bore to optimize hydrogen generation. The rod 540 may be used to provide hydrogen at a faster initial rate than the pellets in response to a high demand for power, and may be recharged by excess hydrogen generated by the chemical hydride portion of the pellet in times of low power demand.

Metal Hydride Preparation Process

The metal hydride fuel may be prepared by first crushing or grinding metal hydride (in a ball mill, for example) to obtain metal hydride particles in the range from 1 um to 1 mm (particles in the range of 10 to 100 um are desired in one embodiment). The metal hydride may also be prepared by repeated exposure to high pressure hydrogen (>500 psi) and then vacuum, which breaks the metal hydride into smaller particles. The resulting metal hydride may then be heated to >100° C. under vacuum (Pressure <10 mTorr) for several hours. High pressure hydrogen (>500 psi) may be applied for several hours. The heating and high hydrogen pressure steps may be repeated for several cycles. The metal hydride may be encapsulated using a fumed silica or sol-gel process described below, or alternately coated with copper. The resulting encapsulated or coated metal hydride may be molded in a cylindrical pellet form. This is just one example method for preparing metal hydride for a pellet. The parameters may be varied in further embodiments, and different methods may be used as desired.

Encapsulation Process (Fumed Silica Method)

One method which may be utilized to embed or encapsulate metal hydride particles in a silica network begins by providing a pre-determined amount of amorphous fumed silica. This substance may be a high purity silicon oxide ($SiO_2$) and is commercially available, such as CAB-O-Sil.R™. grade EH-5 from CABOT Corporation. Fumed silica may be formed by burning silicon tetrachloride vapor in a flame of hydrogen and oxygen.

In one embodiment, the fumed silica is then blended into water to form a paste via a polymerization process. The weight ratio of water to fumed silica can range from 3:1 to 9:1. Metal hydride particles are added to the paste to be embedded into the silica network. The weight ratio of the metal hydride particles to the fumed silica in the paste ranges from 0.18:1 to 2.3:1. In practice, the metal hydride typically comprises 15% to 70% of the finished product by weight. In one embodiment, the metal hydride particles have sizes ranging from 0.5 µm to 100 µm. In one embodiment, it is desired that the particles are smaller than 50 µm. Examples of hydrides that can be used in the composition include pure hydrides such as Pd and more complex alloys of Pd, Ti, La, Ni, Zr, Co and Al. In further embodiments, metal hydrides may be produced in the form of fine particles.

According to one embodiment, the paste is then allowed to dry to form a solid. The simplest method for drying the paste is to allow it to air dry. However, using heat and/or vacuum drying techniques may provide additional beneficial properties. Next, the solid composition may be ground up using a commercial grinder, grain mill or simply a mortar and pestle. Typically the ground up solid is filtered through a sieve to collect granules of a desired size for packing into columns or beds commonly used in hydrogen storage or separations systems.

If desired, the ground up solid can be added back into a new paste of fumed silica and then dried and ground up to form a composition having a double layer of silica with metal hydride particles embedded in the layers. The process may be repeated to generate a composition having multiple silica layers.

Alternatively, the paste can be poured into a mold and then dried using the techniques discussed above to form plates, cylinders, or other desired forms for use in filtering hydrogen from other gases.

For applications where mechanical strength is critical, the paste can be impregnated in a porous substrate or wire network and once again dried using the techniques discussed above. Advantageously, the paste is quite versatile and is readily adaptable for use in a variety of applications.

According to another embodiment of the invention, greater resistance to oxygen and other impurities, a liquid that is non-soluble in water can be added to the paste. Examples of such liquids include common paint thinner and mineral oil spirit type 11, grade A. The non-soluble liquid has the effect of breaking down the paste into particulates that can then be dried using the techniques discussed above. The following steps describe one example embodiment of the invention incorporating the non-soluble liquid.

First, acquire 85 grams of fumed silica, 33 grams of $LaNi_4.25Al_{0.75}$ powder (metal hydride) having a particle size .ltoreq.45 µm and 351 grams of deionized water. The water may then be placed in a blender at median speed. Add the fumed silica and the metal hydride to the water gradually until the entire amount is added and a uniform paste is formed. Switch the blender to low speed and pour into the paste 170 cc of paint thinner (non-soluble liquid). Continue blending until the paste is broken into particulates. The particulates can then be removed from the blender and dried using the techniques discussed above. In addition, the particulates can be ground up and run through a sieve to collect a preferred granule size for the final product.

If desired, the final product based on the embodiments discussed above can be heat treated in the presence of an inert noble gas such as He or Ar to adjust the porosity or mechanical strength of the composition. This heat treating process is known as sintering.

In the final product, the silica particles form a porous network via polymerization of the silica molecules at contacting points. The size of the pores in the network is typically between 1 and 100 nanometers. In contrast, the metal hydride particles are only 0.5 µm (fines) to 100 µm large. Since the metal hydride particles are 5 to 1000 times larger than the silica pores, the metal hydride particles are easily retained in the network. When the product is exposed to a gas mixture containing hydrogen and other gases or undesirable impurities, the hydrogen is able to pass freely through the pores of the network because of its small molecular size. Conversely, the larger molecules of the other gases or impurities are filtered by the silica network from reaching the metal hydride particles held therein. Thus, the product can be freely exposed to the atmosphere without fear of oxidizing the embedded metal hydride. In some embodiments, CO molecules may be filtered with some degree of success. In addition to acting as a filter, the silica network may also provide dimensional stability to the metal hydrides to curb their tendency to break into fines after repeated exposure to hydrogen. Although the silica network cannot prevent the formation of fines entirely, any fines that are produced are held within the network and prevented from finding their way into the hydrogen storage equipment causing resistance to gas flow or even plugging up the system.

Encapsulation Process (Sol-Gel Process)

In one embodiment of the present invention, a hydride composition may be prepared by a sol-gel process generally as follows. The starting material is an organometallic compound such as tetraethoxysilane. A sol may be prepared by mixing the starting material, alcohol, water, and an acid. The sol is conditioned to the proper viscosity and a hydride in the form of a fine powder is added. The mixture is polymerized, then dried under supercritical conditions. The final product is a composition combining an inert, stable and highly porous matrix with a uniformly-dispersed hydride. The composition can rapidly and reversibly absorb surprisingly large amounts of hydrogen (up to approximately 30 moles/kg) at room temperature and pressure. Hydrogen absorbed by the composition can be readily be recovered by application of heat or vacuum.

The composition may be prepared as follows:

1. To prepare the sol solution, add alcohol to water while stirring the water to form a first mixture. The ratio of alcohol to water in the mixture is preferably in the range of two to five parts of alcohol to one part of water. The ratio is chosen in view of the desired properties of the final product. For example, the higher the alcohol:water ratio of the mixture, the more uniform the final product; and the lower this ratio, the more granular the product. Preferably, the alcohol is ethanol, although other alcohols such as methanol may be used.

2. Adjust the acidity of the mixture by adding hydrochloric acid (HCl) until the pH is in the approximate range of 1.0 to 2.5. Stir the mixture for several minutes, preferably for approximately thirty minutes. If desired, other acids such as hydrosulfuric acid ($H_2SO_4$) or nitric acid, ($HNO_3$) may be used. The pH and temperature of the mixture affect the properties of the final product, including its density, porosity, and specific surface area. The optimum conditions for producing a composition with the desired properties are therefore best determined by observation and a modest degree of experimentation.

3. Separately prepare a second mixture by mixing alcohol and an organometallic compound such as tetraethoxysilane $((C_2H_5O)_4Si)$. Add alcohol to the tetraethoxysilane in the ratio of approximately one part ethanol to two parts tetraethoxysilane. Stir for several minutes, preferably for approximately thirty minutes. As for step (1) above, while ethanol is preferred, other alcohols such as methanol may be used.

Suitable organometallic compounds for use in the present invention include, but are not limited to, organometals of the forms $MO_xR_y$ and $M(OR)_x$, where R is an alkyl group of the form $C_nH_{2n+1}$, M is an oxide-forming metal, n, x, and y are integers, and y is two less than the valence of M. Other suitable organometals include the alkoxysilanes, particularly tetraethoxysilane. It will be understood that the optimum admixture of alcohol depends on the particular choice of organometal and the desired properties of the final product.

4. Add the first mixture to the second very slowly, preferably dropwise, stirring continuously, to form the sol solution.

5. Allow the sol to condition in a closed container for several hours at room temperature, preferably for about 24 hours.

6. Remove the cover of the container to evaporate some of the solvents, until the sol reaches the approximate viscosity of heavy oil.

7. When the sol reaches the proper viscosity, add a hydride in the form of fine particles, and stir to uniformly suspend the hydride particles in the solution. The hydride may be added in an amount up to approximately 50 wt. % of the dry gel. However, the catalytic effect of the hydride (discussed below) may be evident even with very small admixtures, as small as 1 wt. % or less of the dry gel.

The hydrogen-absorption rate of hydrides is typically proportional to their surface area. Therefore, the smaller the particle size, the larger the surface area of the hydride and the better its overall hydrogen-absorption rate. The hydride may be a transition metal hydride such as Al, Cu, La, Ni, Pd, Pt, or combinations thereof, and most preferably Pt or a La—Ni—Al alloy. The hydride may be supplied in the form of a fine powder having particles less than approximately 100 µm in size.

8. If desired, the density of the sol-hydride mixture can be adjusted by adding a foaming agent. Suitable foaming agents include, but are not limited to, alkali metal soaps, metal soaps, quaternary ammonium compounds, detergents, alkali metal phosphates, and amino compounds.

9. Polymerize the mixture by equilibrating in air at room temperature and pressure until a gel containing the polymerized material and a liquid as two continuous phases is formed.

Depending on the properties of the sol and the desired properties of the final product, polymerization may be carried out at different temperatures or pressures, in an inert atmosphere (such as helium or argon), or some convenient combination thereof. For example, lower temperatures typically slow down the polymerization reaction and may be desirable to prevent overly abrupt polymerization. The time required for substantially complete polymerization varies from a few minutes to several days, depending on the temperature, pressure, atmosphere, the pH of the sol, the materials used to produce the sol, and so forth.

The optimum conditions for polymerization are best determined by experimentation for each particular combination of materials in view of the desired properties of the composition. Process steps 1 to 8 as described above may also be carried out at any convenient temperature and pressure, or in atmospheres other than air, including but not limited to helium and argon.

10. Dry the gel to remove the liquid phase. Drying may be carried out at the supercritical conditions of ethanol (or other alcohol produced in the polymerization process), that is, the temperature and pressure are maintained at the point where the solid, liquid, and vapor phases of ethanol coexist (243° C. and 63 atm.). Drying under supercritical conditions can yield a composition with a porosity of 90% or higher. Alternatively, drying may be carried out in air, or in other atmospheres including inert atmospheres when a greater density is acceptable.

It will be understood that the process steps described above may be varied in different embodiments. By way of example only, the sol solution (steps 1 to 6) may be prepared by another suitable procedure known in the art, or conditioning (step 5) or evaporation (step 6) omitted if the mixture has a suitable viscosity.

The final product is a composition comprising a porous glass matrix containing uniformly distributed hydride particles. The matrix is highly porous, preferably with a porosity greater than 80% porous and most preferably greater than about 90%. Because of its high porosity, the matrix has a very large specific surface area, preferably greater than approximately 300 $m^2$/gram and most preferably 1000 $m^2$/gram or higher. The composition can be fabricated in the form of pellets or other shapes dimensioned to the anticipated use. The pellets are dimensionally stable, remaining intact after many hydrogen absorption-desorption cycles.

The higher the porosity and specific surface area of the composition, the more matrix surface and hydride surface is available for hydrogen absorption. As noted above, the surface of a porous glass composition normally absorbs only a small amount of hydrogen. Here, surprisingly, the combination of the aerogel matrix and the hdyride is capable of storing very large amounts of hydrogen, more than the sum of the individual capacities of the aerogel and the hydride. While not wishing to be bound by theory, it is believed that the hydride may act as a catalyst to improve the hydrogen-storage capability of the composition. This catalytic effect should be evident even at very low hydride concentrations, as low as 1 wt. % of the dry gel.

By way of example, a composition in a further embodiment may be prepared by adding two parts ethanol to one part water, and adjusting the pH by adding hydrochloric acid. The pH-adjusted mixture is added to a mixture of approximately one part ethanol to two parts tetraethoxysilane. The sol is stirred for thirty minutes, then conditioned for about 24 hours and evaporated until it reaches the approximate viscosity of heavy oil. A hydride in an amount of 40 wt. % of the dry gel is added. The hydride is La—Ni—Al alloy, preferably in the form of particles less than 100 µm in size in order to promote uniform dispersion throughout the matrix and more effective contact with hydrogen, in an amount of 40 wt. % of the dry gel. The mixture is polymerized, then dried at room temperature and pressure.

This composition absorbs up to 10 moles/kg of hydrogen at room temperature and atmospheric pressure. The amount of hydride present in one kilogram of the composition is capable of absorbing only 5 moles of hydrogen. Since the aerogel alone can absorb only a negligible amount of hydrogen, the increased capacity is due to the synergy of the hydride and aerogel.

Depending on the choice of ingredients and the conditions under which the process steps are carried out, the composition may absorb up to 30 moles of hydrogen per kilogram at room temperature and pressure, rapidly and reversibly. Hydrogen absorbed by the composition can readily be recovered by heat or evacuation. Uses for the composition include hydrogen storage and recovery, recovery of hydrogen from gas mixtures, and pumping and compressing hydrogen gas.

Properties and Characteristics of Metal Hydrides

Aluminum substitution in LaNi5 may affect the equilibrium hydrogen pressure, decreasing it with increased substitution. In one embodiment, it is desired to use an aluminum substitution (y value) of between 0.1 and 1, which yields an equilibrium pressure at 25 C of ~1.0-0.1 bar.

Roles of Metal and Chemical Hydride:

In one embodiment, the chemical hydride is the primary, high-density hydrogen storage material. It generates hydrogen irreversibly when reacted with water vapor. The rate at which the chemical hydride releases hydrogen is directly proportional to the delivery rate of water vapor. When pulses of current (power) are required, the consumption rate of hydrogen exceeds the delivery rate of water to the chemical hydride, and thus also exceeds the hydrogen generation rate. In such a situation, the hydrogen is rapidly depleted and the pulse cannot be sustained for long periods of time. It is desirable to increase the period of time a current pulse may be sustained. This is accomplished in one embodiment, by adding a metal hydride (LaNiAl, TiFe, etc) to the chemical hydride fuel pellet. Metal hydrides have the ability to quickly and reversibly adsorb and desorb large quantities of hydrogen at a relatively constant pressure. Thus, when a current (power) pulse is required, the metal hydride can quickly desorb enough hydrogen to maintain the pulse for long periods of time. When the pulse is over, hydrogen liberated by the chemical hydride is used to slowly recharge the metal hydride.

In one embodiment, the pellet has a selectively permeable outer membrane/coating. The pellet is an annular porous LiAlH4 fuel pellet with periodic gaps (bores) in fuel pellet to aide diffusion of water vapor into and hydrogen out of the fuel pellet. The pellet may also have an encapsulated metal hydride in the pellet core. A surrounding layer of water reactive LiAlH4 insures that no water vapor reaches metal hydride core, preventing corrosion/degradation of metal hydride. In one embodiment, a thermally conductive rod 550 is disposed in the center of core 540 proximate and thermally coupled to the metal hydride, and connecting to the fuel cell can to facilitate heat transfer into and out of metal hydride pellet. The rod 550 facilitates the absorption of heat in the metal hydride, allowing it to desorb (discharge) hydrogen. Rod 550 also allows the metal hydride to reject heat to adsorb hydrogen (recharge). In a further embodiment, a porous metal mesh surrounding the encapsulated metal hydride pellet may be used as a heat transfer mechanism.

In one embodiment, a plurality of bores may be provided as illustrated in a top view of a fuel pellet 600. A vertical bore 610 along the axis is formed in one embodiment, with other vertical bores 615 and 520 illustrated. Horizontal bores 625 and 630 are also illustrated. Bores may also be formed on angles between those shown in further embodiments. Single or multiple bores at the same or different angles may be utilized in various embodiments. Selected bores may also contain metal hydride in various embodiments.

Copper Coating Process:

In one embodiment, the metal hydride may be coated with copper. With respect to the process described below, the quantities used in the process are scalable, the alcohol is ethanol, CH3CH2OH, or other alcohol based on input. In one embodiment, LaNiAl is used along with a Cu ratio of 100:5. The ratio may be varied according to the need. Selected steps may be performed quickly to minimize evaporation.

Procedure:

In a First Container:
1. Dissolve 3.5 g CuSO4 into 50 ml water.
2. Add 0.5 g EDTA (ethylenediamine tetraacetic acid, $(HO_2CCH_2)_2NCH_2CH_2N(CH_2CO_2H)_2)$.
3. Heat at 50° C., agitate for 30 min to form the coating solution.

In a Second Container:
1. Wet 27.9 g LaNi4.25Al0.75 powders with 0.63 g (~0.79 cc) ethanol (CH3CH2OH).
2. Add drops of formaldehyde (HCHO), total 1.3 g (~1.59 cc). Agitate to make it uniform.

In a Combined Container:
1. Combine the wetted LaNi4.25Al0.75 and the coating solution. Agitate intensively for 10 min.
2. Filter out the LaNi4.25Al0.75 powders.
3. Rinse 5 times with DI water. Dry naturally in air.
4. (optional) Finally, compress the powders into desired shape. Use a top compressive pressure of 20 MPa.

Manufacturing a Fuel Cell Stack

In one embodiment, a fuel cell stack, such as fuel cell stack 210 may be manufactured as a thin film. It may be less than one mm thick in some embodiments, and flexible such that it is conformable to many different shapes. Multiple layers of the fuel cell stack 210 may be rolled or otherwise stacked together, and result in a flexible film that can be bent around the fuel or valves for ease of manufacture. The following layers are described for use in a cylindrical battery shape. Other layouts of layers may be used to form different shapes. The example layouts provide for the formation to two fuel cells coupled in series.

Figure 7A:
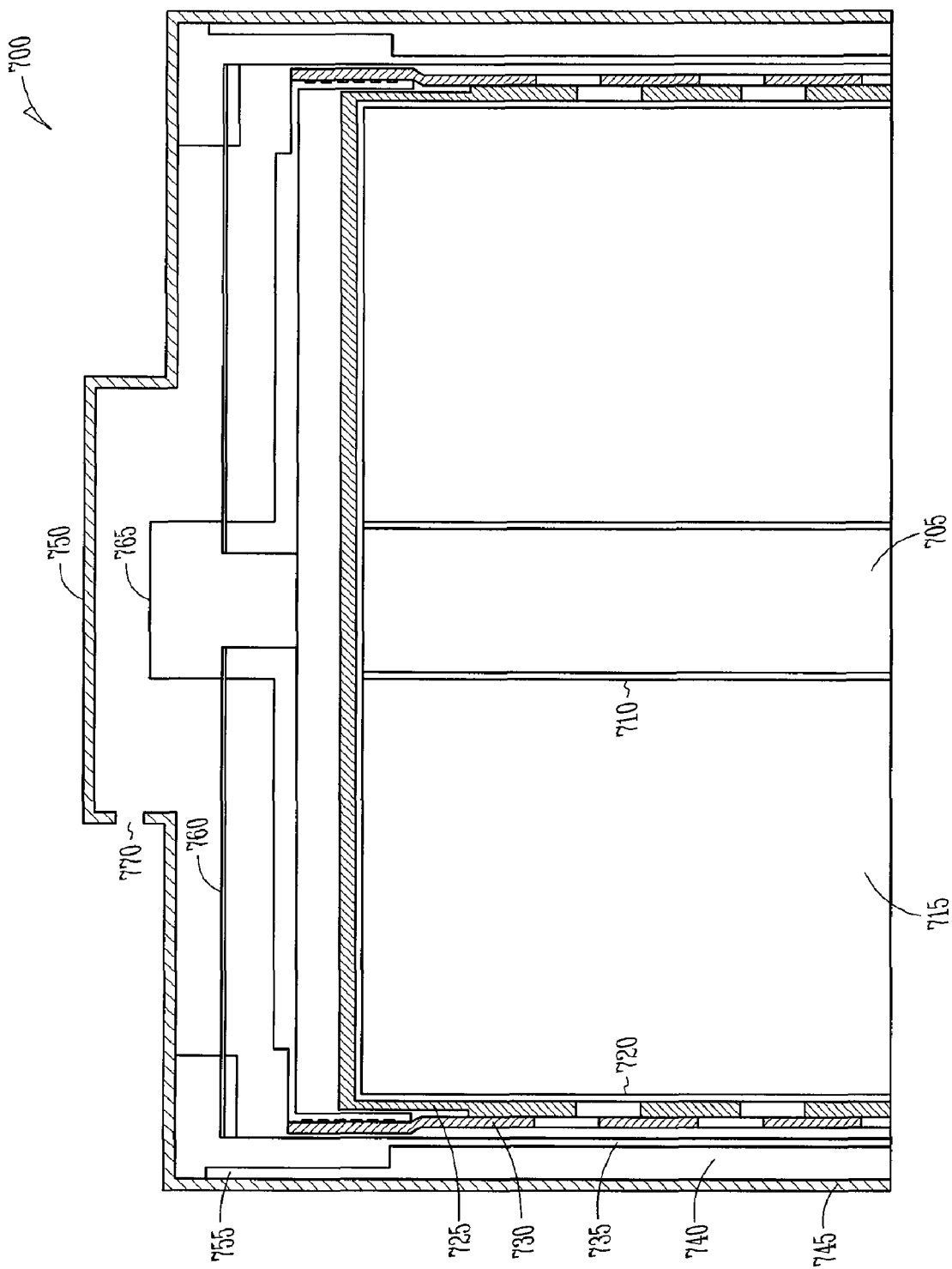
FIGS. 7A and 7B are cross sections of a top and bottom portions of a power generator having a fuel cell stack according to an example embodiment.

FIG. 7A is a cross sectional representation of a top portion of an example power generator at 700. Beginning inside power generator 700, a hydrogen generating fuel portion in one embodiment includes a porous metal hydride 705 within a porous thermal conductor layer 710. The hydride 705 and conductor layer 710 are disposed within a chemical hydride 715. These fuels are provided within a selectively permeable membrane 720.

A fixed valve 725 is disposed around the fuel mixture, and includes multiple openings such as slots for allowing hydrogen and water vapor to pass. Around the fixed valve 725 is a moveable valve 730, having openings that selectively line up with or cover the openings in the fixed valve 725.

An anode support 735 surrounds the valve assembly and supports a fuel cell stack 740, that receives hydrogen from the fuel and oxygen from ambient air, and converts them to water vapor and electricity. The fuel cell stack resides within a container 745, that is formed with an external cathode electrode 750 that is electrically coupled to a cathode within the fuel cell stack via a tab 755. Openings are provided in container 745 to supply oxygen from ambient air to the cathode of fuel cell stack 210.

A pressure responsive valve diaphragm 760 is coupled to a valve pin 765, for moving the moveable valve 730 to regulate the flow of hydrogen and water vapor responsive to electrical demand placed on power generator 700. A vent 770 to ambient may be formed in the cathode 750 or other convenient location to provide ambient pressure to valve diaphragm 760.

Figure 7B:
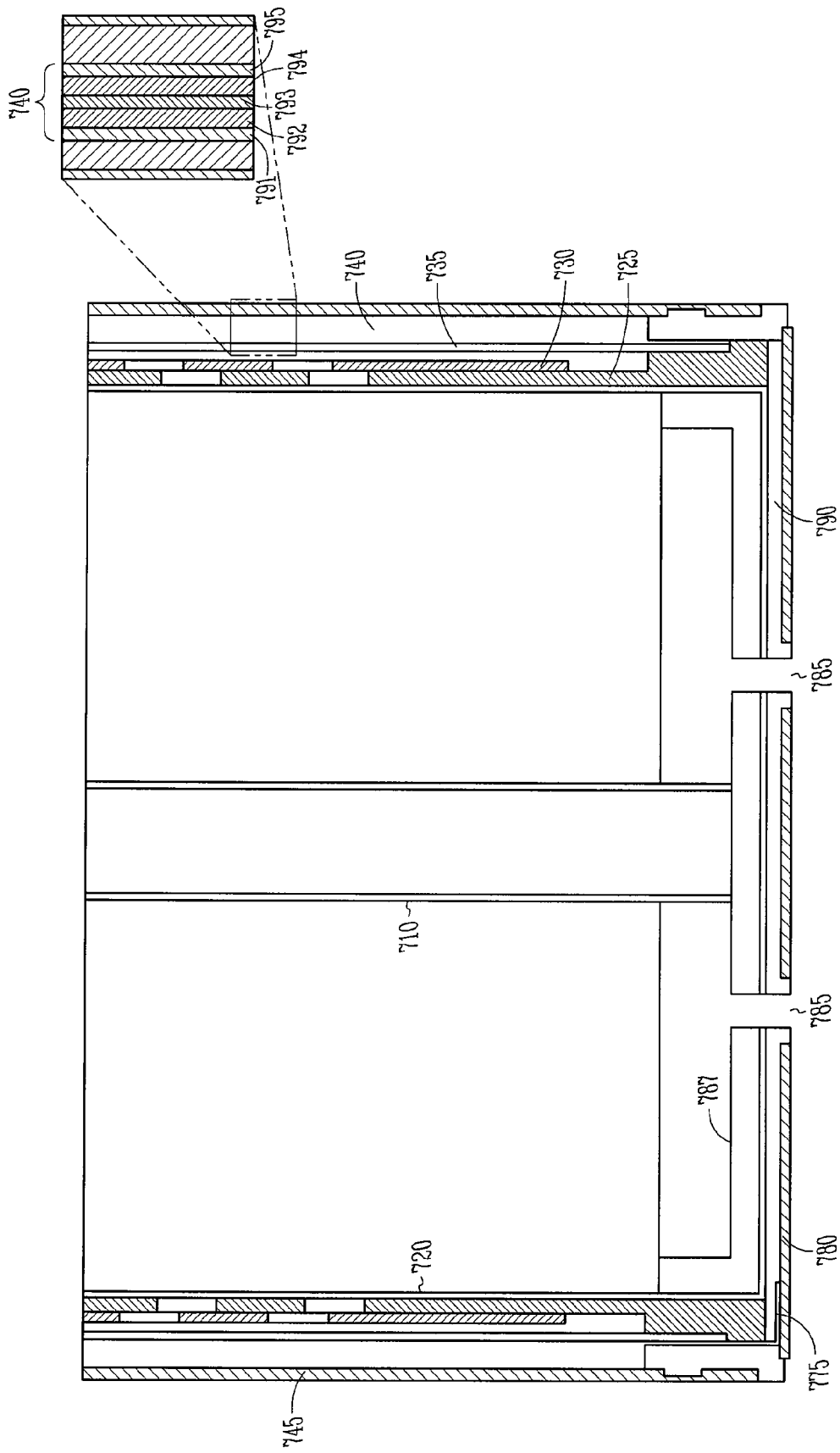

A lower portion of the power generator 700 is illustrated in FIG. 7B, which is numbered consistently with FIG. 7A. An anode output tab 775 is coupled to an external anode electrode 780. Hydrogen flushing and filling ports 785 may be provided through the anode electrode 780, and a non-conductive base 790, which may be constructed of the polymer PET in one embodiment. In a further embodiment, a base support layer 787 is formed of metal, such as stainless steel, and provides additional support. In one embodiment, the base support layer 787 functions to prevent the fuel from expanding and pushing out the bottom of the power generator 700. It also provides additional mechanical strength (resistance to crushing) to the overall power generator 700.

Figure 7C:
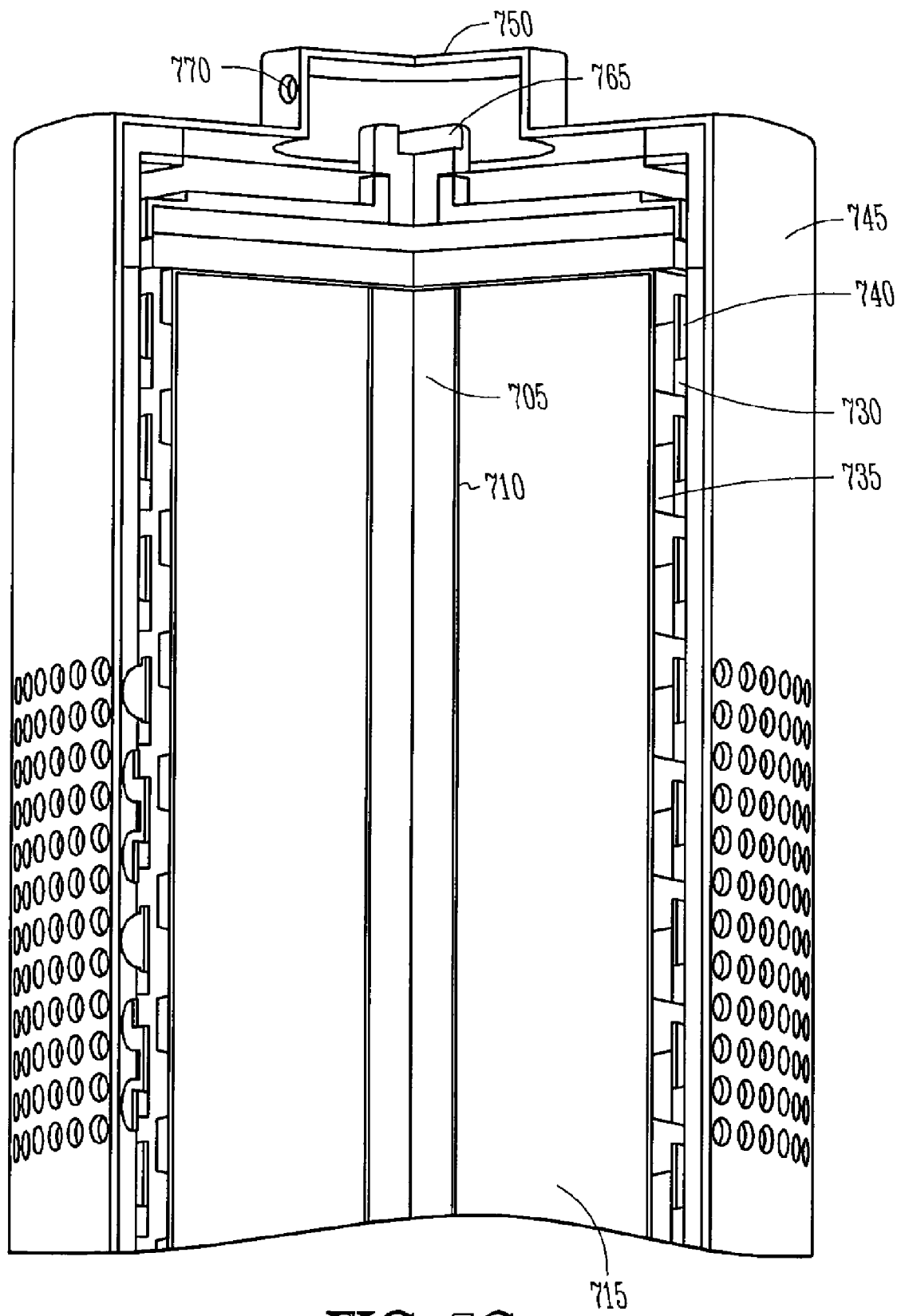
FIG. 7C is a partial cut away of a perspective view of the top of the power generator illustrated in FIG. 7A

A partial cut away perspective view of the upper half of the power generator 700 is illustrated in FIG. 7C, which is numbered consistently with FIG. 7A. In one embodiment, the power generator is cylindrical in shape, and may be formed consistent with form factors associated with common batteries for electronics, or other batteries as desired.

In one embodiment, the fuel cell stack 740 comprises an anode electrode 791 coupled to an adhesive and anode gas diffusion layer 792. The gas diffusion layer 720 is coupled to an ion exchange membrane 793, such as a Nafion® membrane, which in turn is coupled to an adhesive and cathode gas diffusion layer 794. The fuel cell stack 740 also includes a cathode electrode 795. Each of these elements is formed as a layer and stacked or rolled together, with the two double sided adhesive and gas diffusion layers 792 and 794 providing retentive adhesion. In further embodiments, the layers may be adhered in different manners, such as mechanical fasteners or adhesive on different layers. In one embodiment, the layers are each adhered together, forming a gas tight stack.

Figure 8:
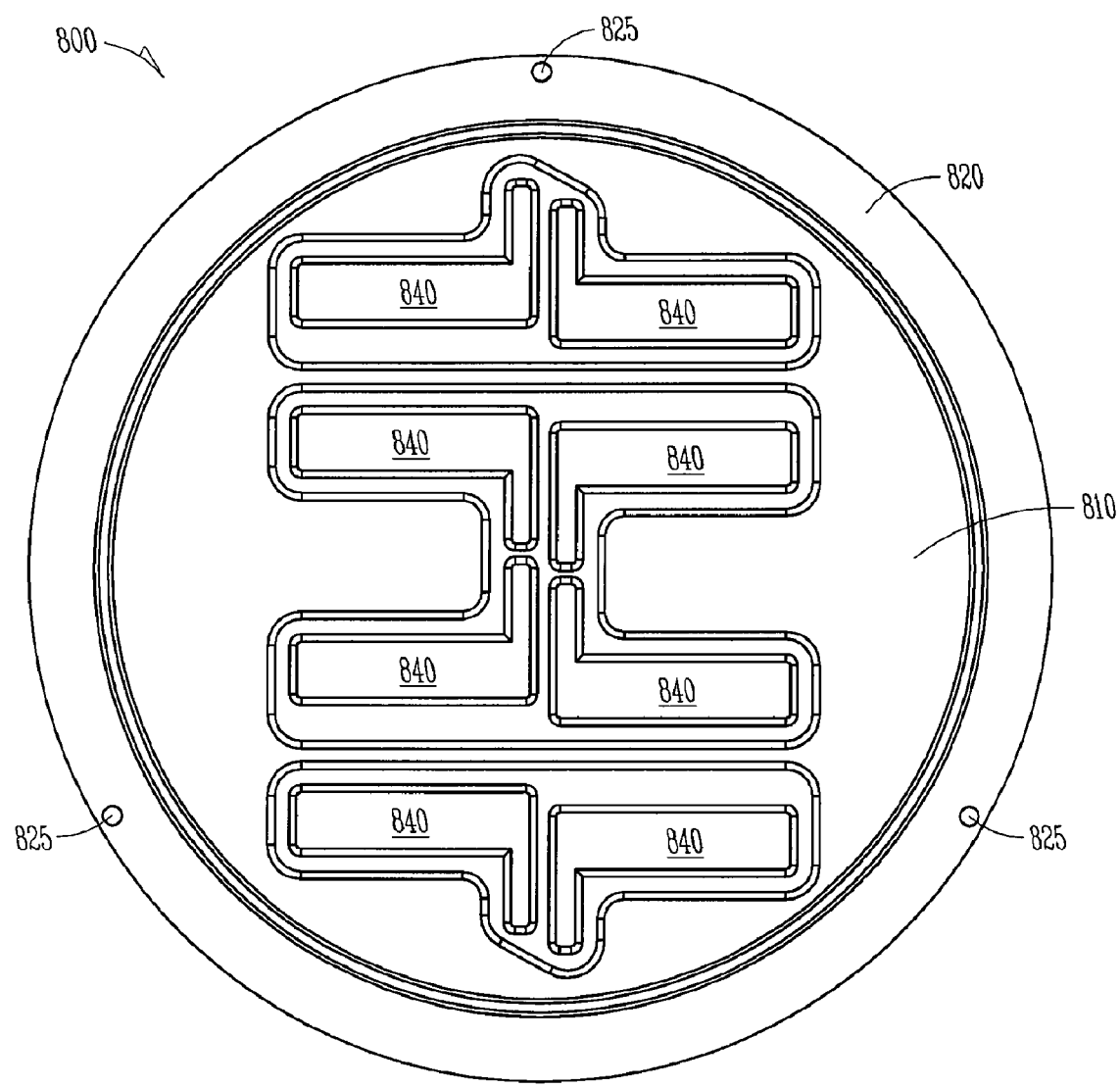
FIG. 8 is a top view of an anode mask according to an example embodiment.

The formation of the individual layers in the fuel cell stack will now be described, followed by an expanded view illustrating how the layers are assembled and used in a power generator. To form the anode electrode, an anode mask 800 in FIG. 8 may be used in one embodiment. A polymer substrate 810, such as KAPTON, or PET is taughtly supported by a ring 820. The ring 820 contains registration or alignment devices such as pins 825 to allow precise positioning of the ring 820. The mask 800 has multiple openings 840 to allow deposition of metal through the mask openings 840 forming four pairs of anodes in this example.

Figure 9:
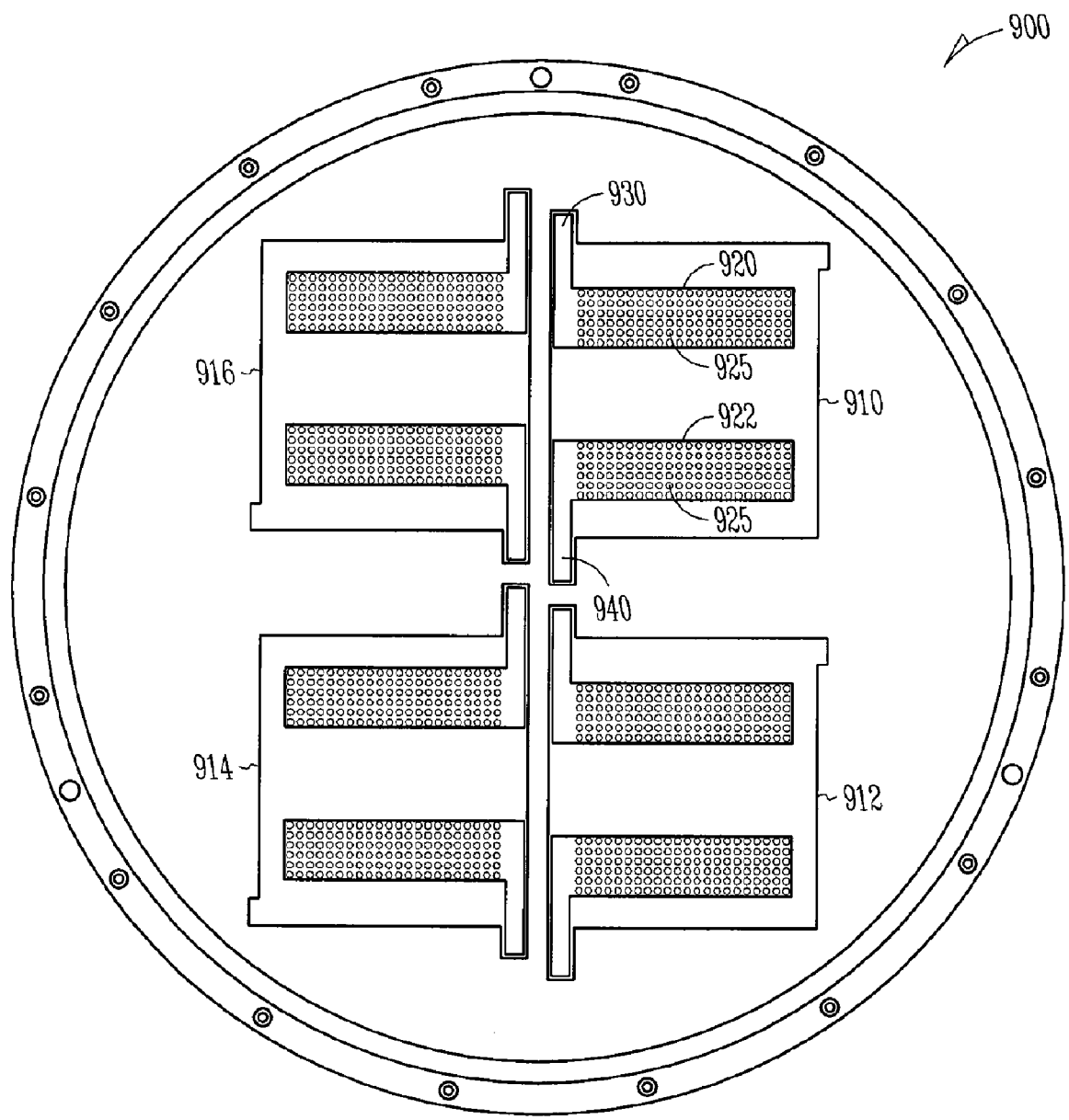
FIG. 9 is an illustration of multiple patterned anodes having holes according to an example embodiment.

Metal may be deposited such as by evaporation through the mask 800 onto a 2 mil thick PET layer in one embodiment. A typical metallization process may include an ion mill to clean the PET surface, followed by a few hundred angstrom (200-300 in one embodiment) of a Ti and/or Al adhesion layer, followed by 1-2 microns of Au (gold). Other conductive materials may be used, but it is desirable that they be highly conductive and corrosion resistant. Many other processes may be used for forming the conductive layer or layers of the anode. After deposition, the mask 800 is lifted, and a laser may be used to cut individual patterns 910, 912, 914 and 916 as shown in FIG. 9. Each pattern contains two anodes 920, 922 that have laser cut holes 925 to allow for gas diffusion through the electrode. Each anode also has a tab 930 in this embodiment, allowing for a series electrical connection of the two fuel cells when the fuel cell stack is conformed to a desired shape, such as a cylinder.

Figure 10:
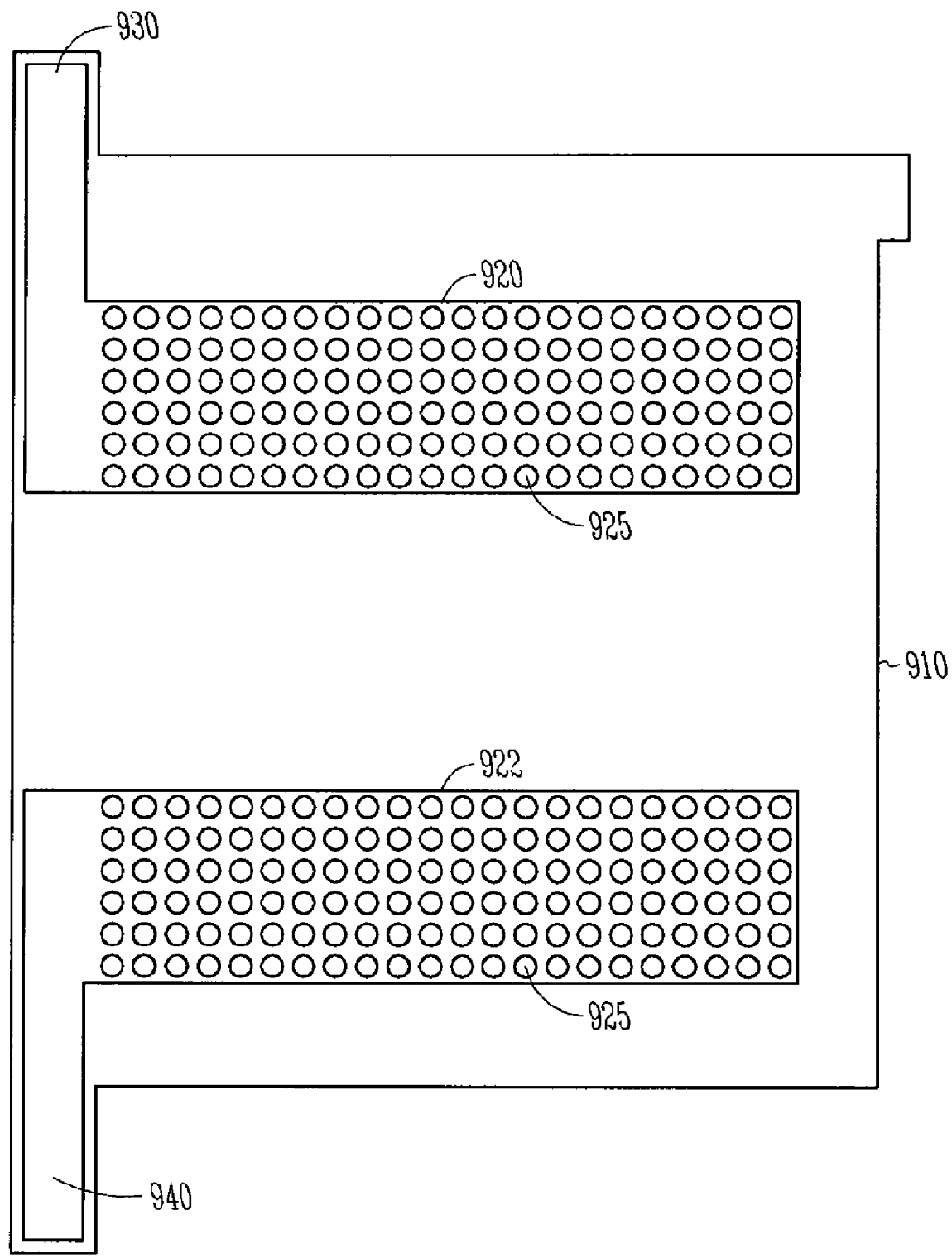
FIG. 10 is a blown up view of a pattern of FIG. 9 according to an example embodiment.

FIG. 10 is a blown up view of pattern 910, illustrating electrodes 920 and 922 in larger form. In one embodiment, one side of the pattern 910 may have an adhesive thereon for adhering to an anode support. In one embodiment, the pattern is 2 mil thick PET with 1 mil adhesive, 200 A Ti, and 1 um Au.

Figure 11:
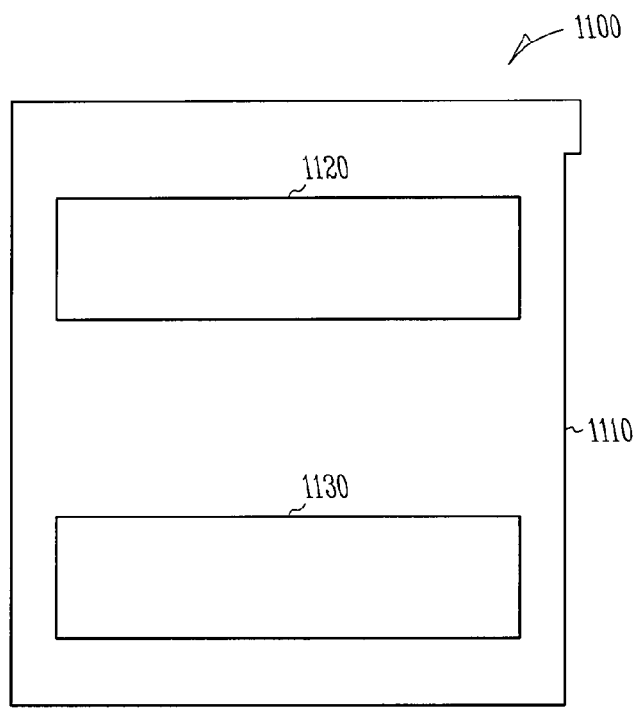
FIG. 11 illustrates an adhesive layer with an anode gas diffusion layer according to an example embodiment.

FIG. 11 illustrates an adhesive layer 1100 with an anode gas diffusion layer. An alignment tab 1110 is provided in a desired location to facilitate alignment with other layers. Adhesive layer 1100 has openings 1120 and 1130 corresponding to the anodes 920 and 922. In one embodiment, the adhesive layer may be 2 mil thick Kapton with 1 mil adhesive on each side, with total thickness of 4 mils. The thickness may vary considerably if desired and is approximately 0.1 mm thick in a further embodiment. Openings 1120 and 1130 further comprise gas diffusion layers, such as 4 to 6 mil thick carbon paper in one embodiment.

Figure 12:
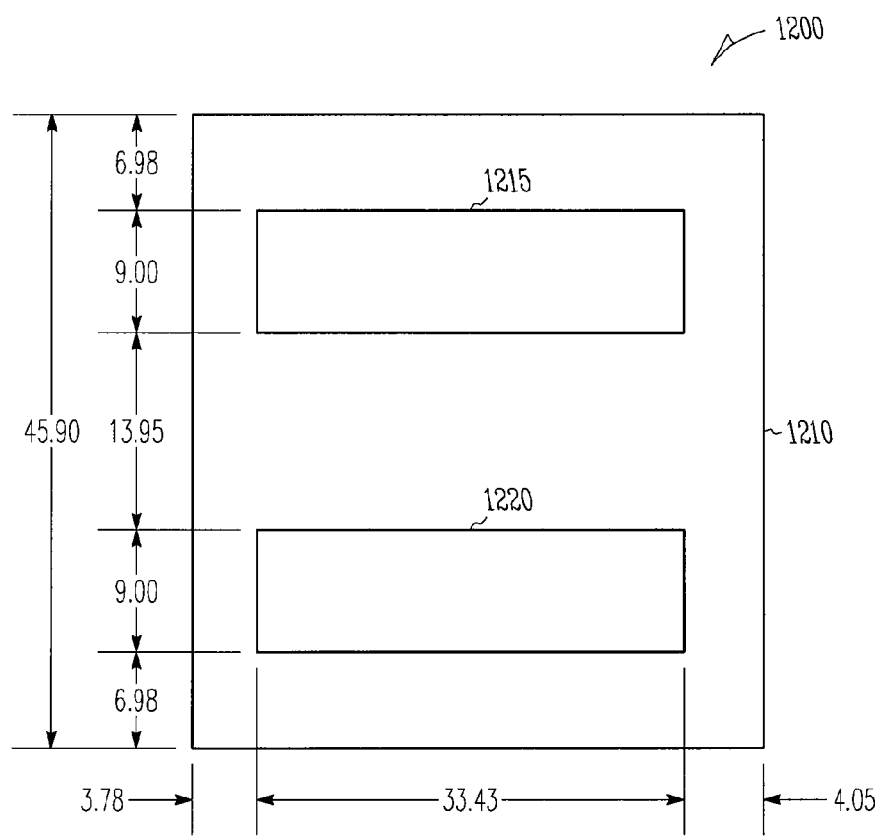
FIG. 12 represents an ion exchange membrane layer according to an example embodiment.

An ion exchange membrane layer is illustrated in FIG. 12 at 1200. In one embodiment, a frame 1210 of Kapton is used to support Nafion membranes 1215 and 1220. Membranes 1215 and 1220 are positioned to align with 1120, 1130 and anodes 920 and 922 when assembled. The membranes 1220 and 1215 may be 1 mil thick Nafion NRE211 with 0.5 mg/cm$^2$ of carbon supported platinum electrodes. Different thicknesses of membranes and other layers may be used in further embodiments consistent with retaining a desired flexibility for the fuel cell stack. In one embodiment, two cells are being formed with the multiple layers that will be coupled in series when assembled.

Figure 13:
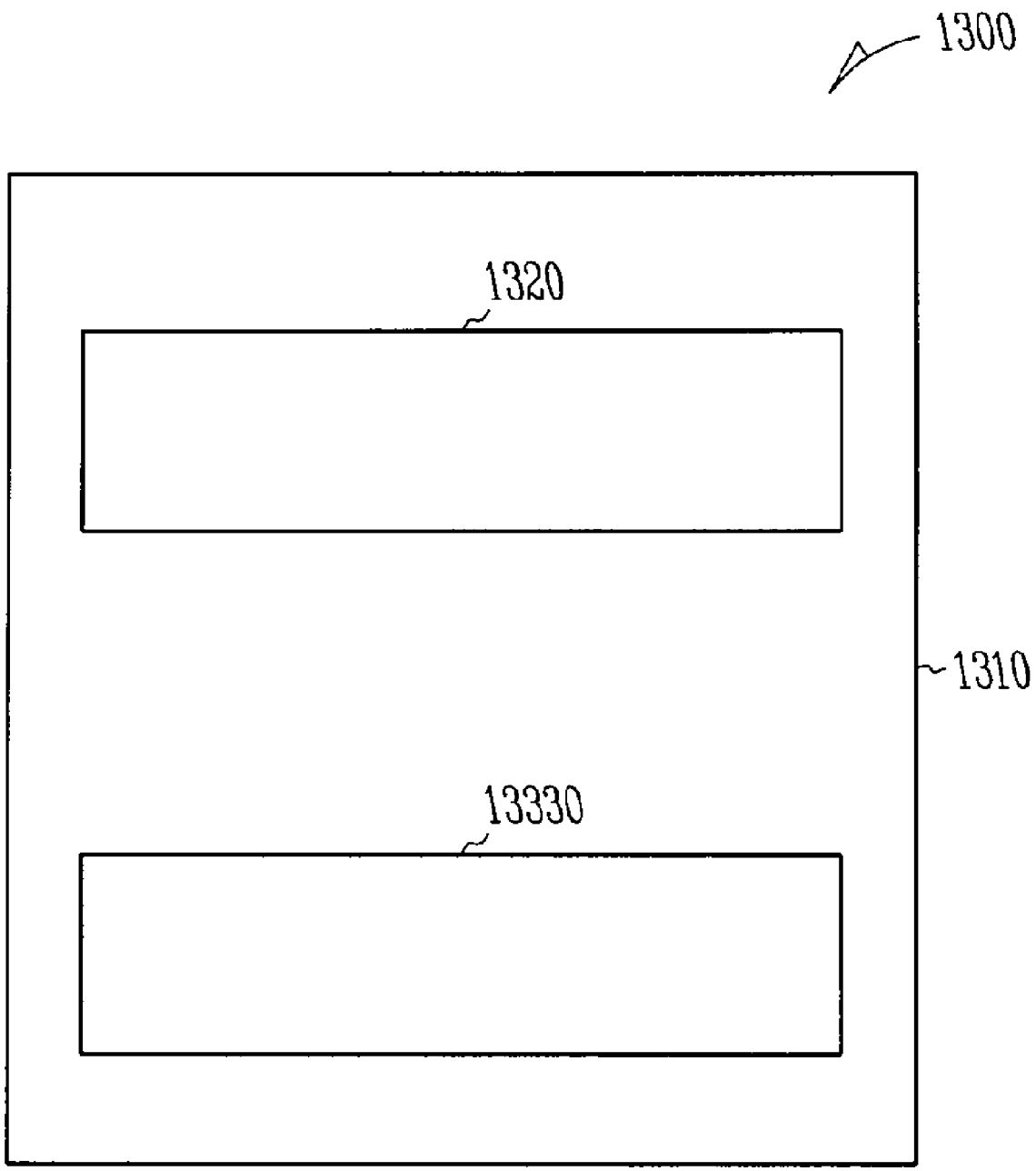
FIG. 13 represents a double sided adhesive layer including a gas diffusion layer for a cathode layer according to an example embodiment.

FIG. 13 at 1300 represents a double sided adhesive layer including a gas diffusion layer for the cathode layer. It may be similar to that shown at 1100 in FIG. 11, including two openings 1320 and 1330 for alignment with the cathodes in the next layer. In one embodiment, the adhesive layer may be 2 mil thick Kapton with 1 mil adhesive on each side, with total thickness of 4 mils. The thickness may very considerably if desired and is approximately 0.1 mm thick in a further embodiment. Openings 1320 and 1330 further comprise gas diffusion layers, such as 4 to 6 mil thick carbon paper in one embodiment.

Figure 14:
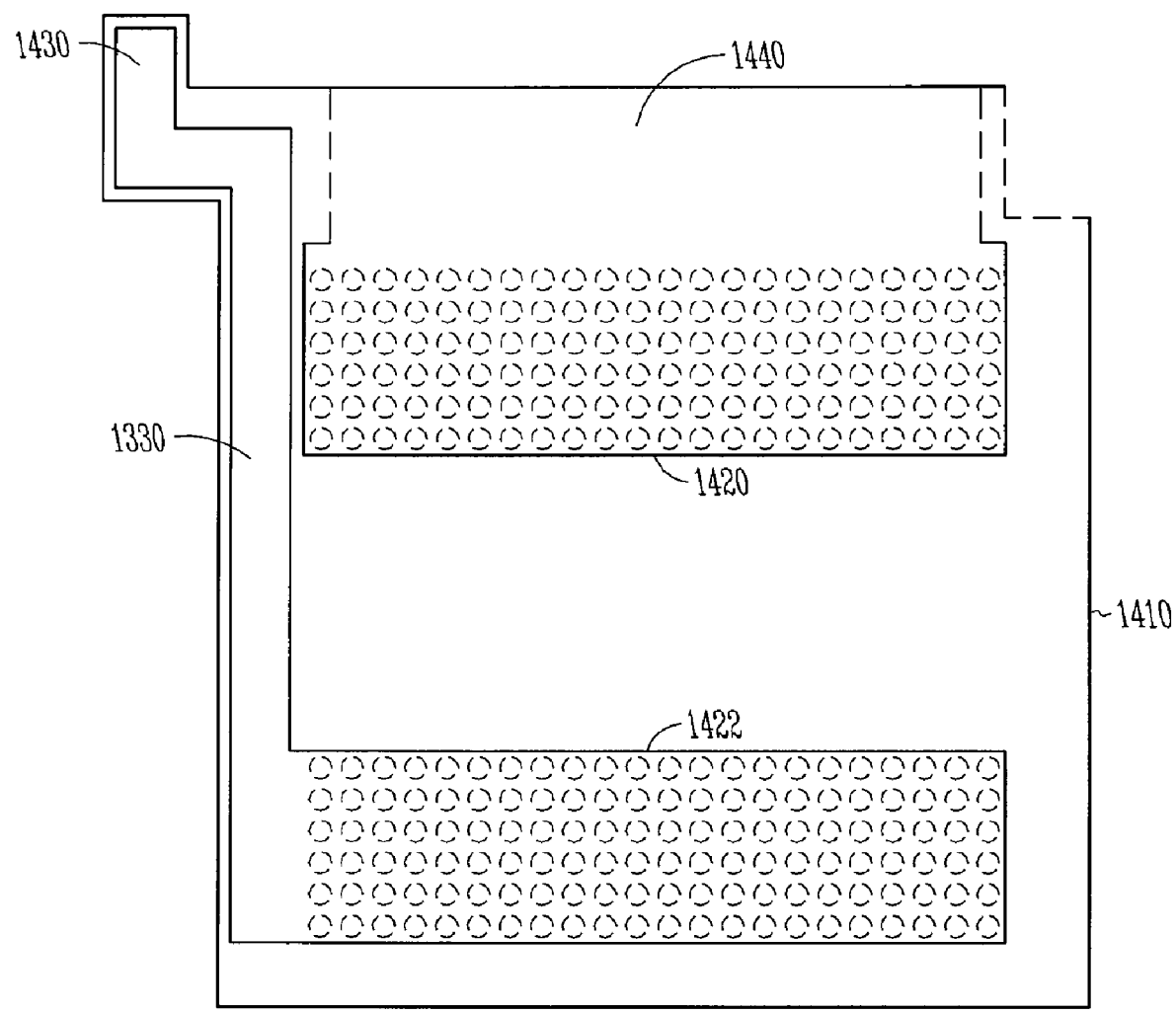
FIG. 14 illustrates a cathode pattern having electrodes with holes according to an example embodiment.
Figure 15:
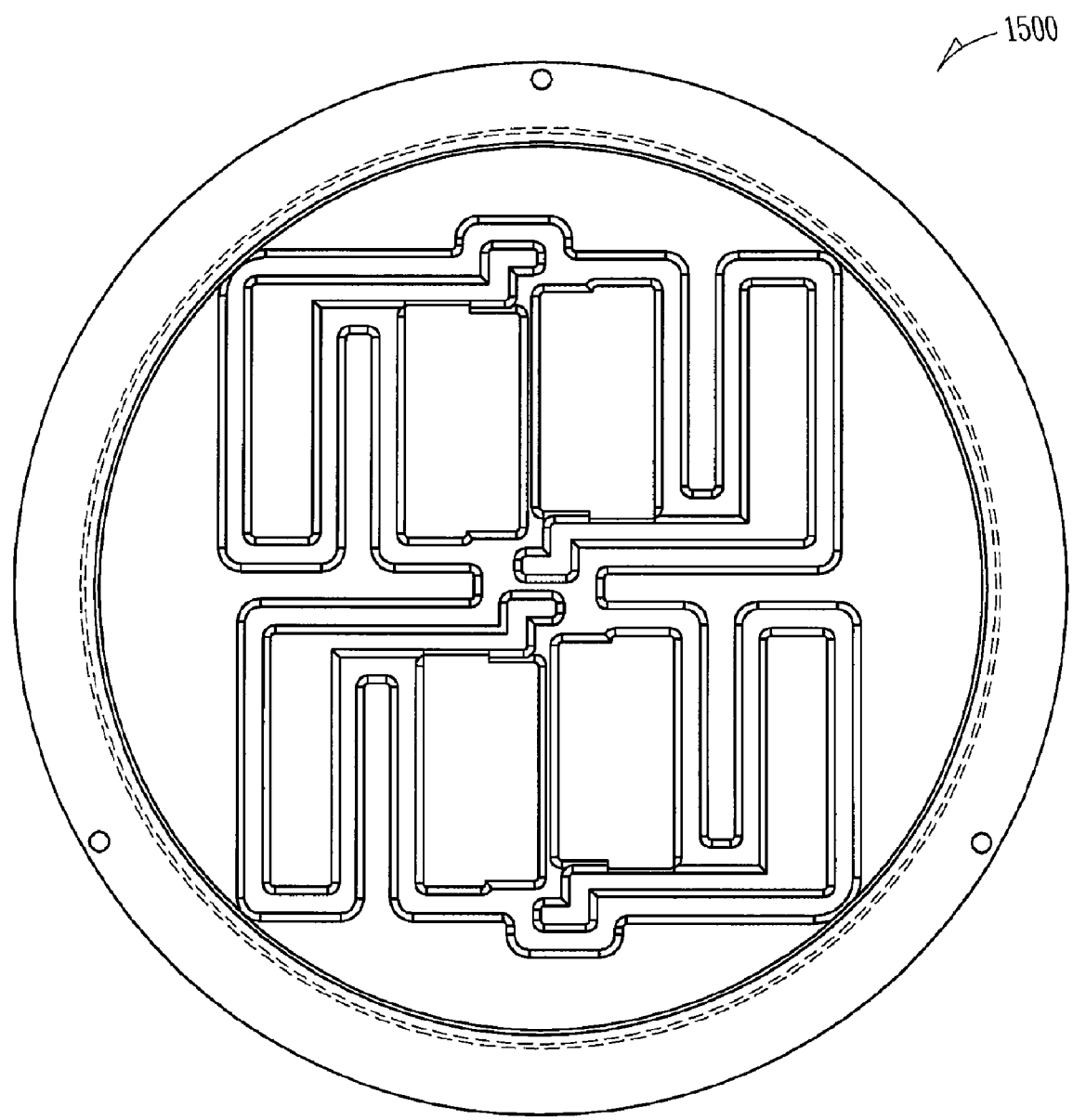
FIG. 15 illustrates an anode mask according to an example embodiment.
Figure 16:
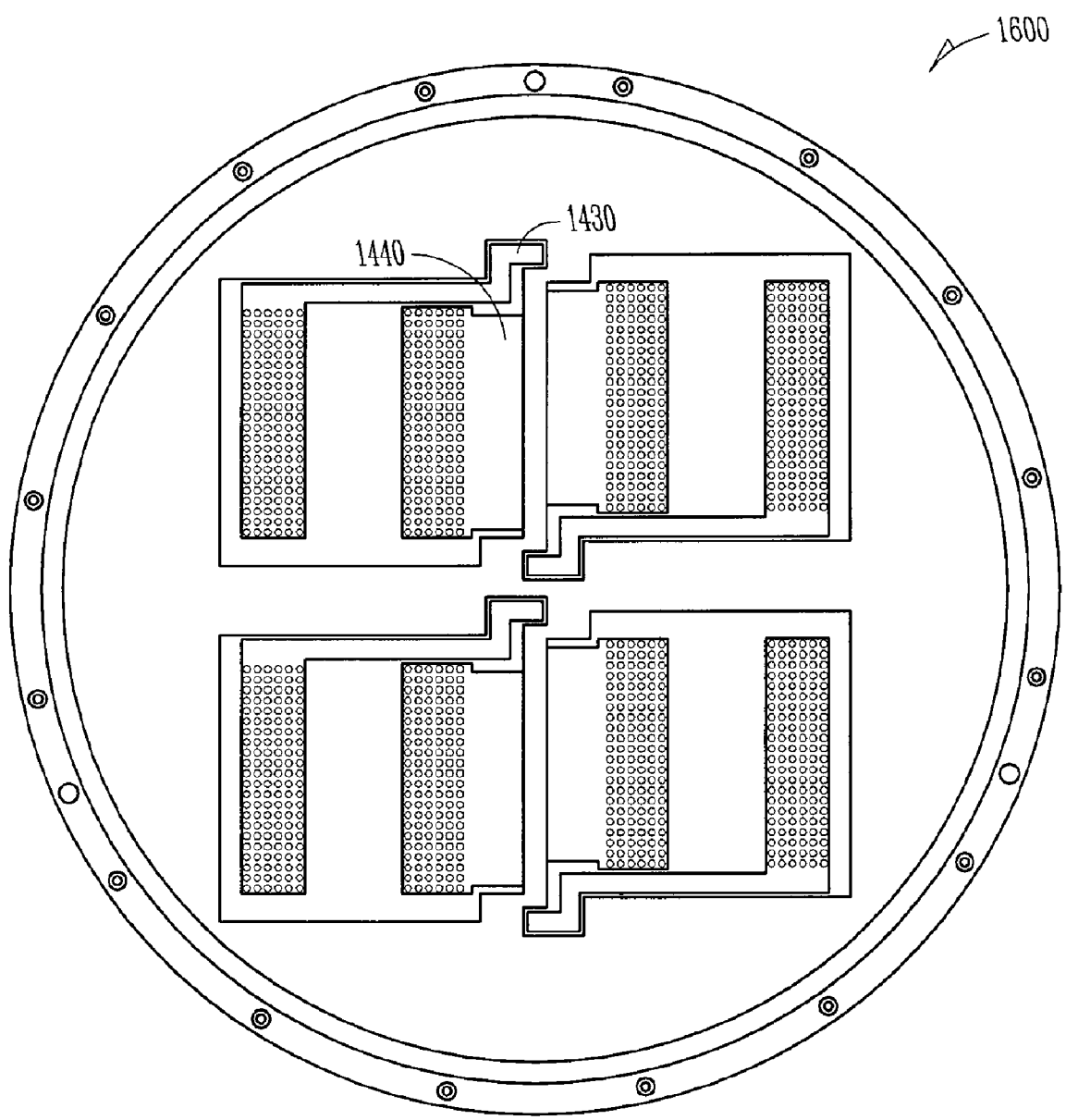
FIG. 16 illustrates multiple anode patterns using the mask of FIG. 15 according to an example embodiment.

FIG. 14 illustrates a cathode pattern 1410 having electrodes 1420 and 1422 shown with holes similar to those in the anodes described earlier. In one embodiment, the pattern is 2 mil thick PET with 1 mil adhesive, 200 A Ti, and 1 um Au. A connector 1430 is shown facilitating coupling of the resulting fuel cells in series. Pattern 1410 may be formed in the same manner as the anode pattern using mask shown at 1500 in FIG. 15, resulting in multiple patterns which are laser cut with holes and cut into separate patters in FIG. 16 at 1600.

Figure 17:
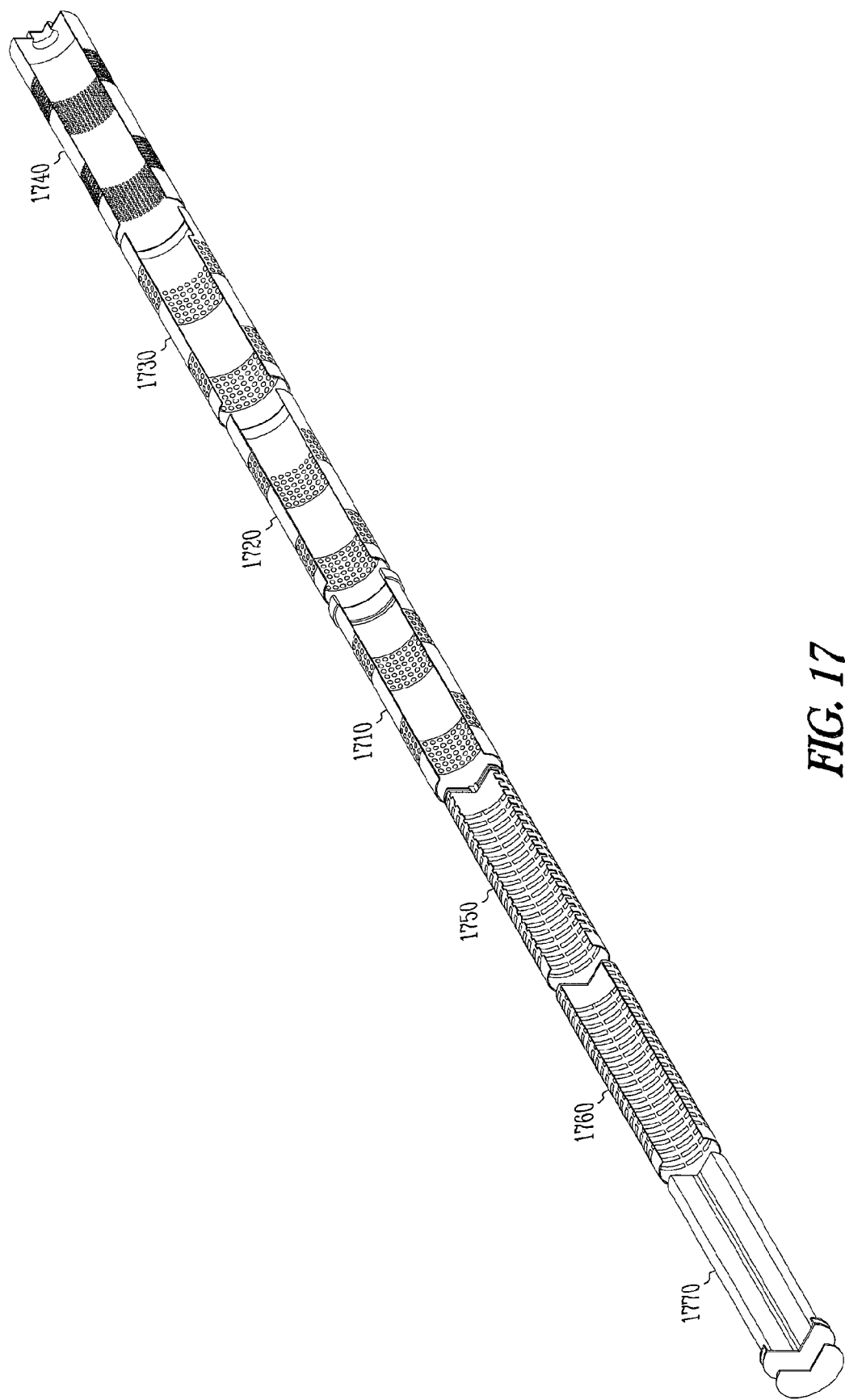
FIG. 17 is an exploded perspective view of a fuel cell stack according to an example embodiment.

The layers of the fuel cell stack described above may be assembled in many different ways. In one embodiment, individual layers may be rolled one by one onto an anode support using a dual roller fixture. In a further embodiment, the layers may be stacked on a planar surface, and then rolled as a stack onto an anode support 1710 as illustrated in FIG. 17, which is an exploded perspective view of a fuel cell stack and power generator according to an example embodiment.

In one embodiment, the order of the fuel cell stack layers is as described above, starting with the anode electrode layer 1720, the adhesive and anode gas diffusion layer, the membrane, the adhesive and cathode gas diffusion layer, followed by the cathode electrode 1730. The anode support 1710 is a rigid cylinder on which the anode electrode is adhered, and supports the stack and compresses it to a specified degree against the inside of container 745.

The resulting two cells are electrically coupled in series in one embodiment by virtue of the electrode designs. Tab 930 on anode 920 and tab 1430 on cathode 1422 are electrically connected. A tab 1440 electrically connects cathode 1420 to anode support 1710. Container 745 is electrically connected to anode support 1710 and functions as the cathode terminal of the power generator. Tab 940 is connected electrically to anode plate 230 which functions as the anode terminal of the power generator. The anode support 1710, with the fuel cell stack layers adhered to it is inserted into a sliding valve 1750 which is inserted into a fixed valve 1760, followed by the fuel and membrane 1770. FIG. 17 illustrates an efficient and convenient method by which a power generator may be assembled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A hydrogen producing fissurized pellet comprising a chemical hydride and metal hydride.

2. The hydrogen producing substance of claim 1 wherein the chemical hydride evolves hydrogen spontaneously upon exposure to water vapor, and the metal hydride reversibly absorbs/desorbs hydrogen based on temperature and hydrogen pressure.

3. A hydrogen producing substance comprising a chemical hydride and metal hydride, wherein the chemical hydride evolves hydrogen spontaneously upon exposure to water vapor, and the metal hydride reversibly absorbs/desorbs hydrogen based on temperature and hydrogen pressure, and wherein the chemical hydride is formed as a pellet having a hollow cylindrical shape and the metal hydride is concentric with and disposed within the hollow portion of the chemical hydride.

4. The hydrogen producing fuel of claim 3 and further comprising a heat conductor thermally coupled with the metal hydride.

5. The hydrogen producing fuel of claim 2 wherein the metal hydride is encapsulated within a porous silica or glass network.

6. The hydrogen producing fuel of claim 2 wherein the metal hydride is coated in copper.

7. The hydrogen producing fuel of claim 1 and further comprising a heat conductor disposed proximate the metal hydride.

8. The hydrogen producing fuel of claim 1 and further comprising a water vapor permeable, liquid water impermeable material formed about the chemical hydride.

9. A hydrogen producing substance comprising a chemical hydride and metal hydride wherein the chemical hydride is formed in a pellet shape, is porous and contains paths to allow water vapor to diffuse into the chemical hydride while still maintaining its shape.

10. The hydrogen producing substance of claim 9 wherein the pellet is cylindrical in shape and has a circumference and length suitable for inclusion in a power generator having the shape of a "AA", "AAA", "C" or "D" battery form factor.

11. A hydrogen producing fuel comprising a solid, water reactive fuel pellet form that is non-homogenous and is fissurized to allow water vapor to seep into the fissures.

12. The fuel of claim 11 and further comprising a water vapor permeable, liquid water impermeable material formed about the fuel pellet.

13. The fuel of claim 12 wherein the pellet has a circumference and combined length adapted for inclusion in a power generator having the shape of a "AA", "AAA", "C" or "D" battery form factor.

14. The fuel of claim 11 and further comprising a hydrophobic material dispersed around and in the fuel pellet.

15. The fuel pellet of claim 11 and further comprising a metal hydride material within the pellet.

16. A power generator comprising:
   a container;
   an ion exchange membrane within the container that produces water and energy from combining hydrogen with oxygen; and
   a fissurized fuel pellet within the container, the fuel pellet having both a chemical hydride and a metal hydride that produce hydrogen when exposed to water vapor.

17. The power generator of claim 16 and further comprising a water vapor permeable, liquid water impermeable material formed about the fuel pellet.

18. The power generator of claim 16 and further comprising a valve separating the ion exchange membrane and the fuel pellet.

19. The power generator of claim 17 wherein the water vapor permeable, liquid water impermeable material comprises one or more layers of material comprising at least one of a fluoropolymer, polytetrafluoroethylene, oil or rubber.

20. The power generator of claim 19 and further comprising a hydrophobic material dispersed around and in the fuel pellet.

21. The power generator of claim 20 wherein the pellet is sufficiently fissurized to allow water vapor to seep into the fissures while still maintaining its shape.

22. The power generator of claim 19 wherein the pellet is of cylindrical shape.

* * * * *